United States Patent
Li et al.

(10) Patent No.: US 11,031,678 B2
(45) Date of Patent: Jun. 8, 2021

(54) BASE STATION ANTENNAS HAVING ARRAYS WITH FREQUENCY SELECTIVE SHARED RADIATING ELEMENTS

(71) Applicant: CommScope Technologies LLC, Hickory, NC (US)

(72) Inventors: Yunzhe Li, Suzhou (CN); YueMin Li, Suzhou (CN); GuoLong Xu, Suzhou (CN); Bo Wu, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/829,152

(22) Filed: Mar. 25, 2020

(65) Prior Publication Data
US 2020/0328503 A1    Oct. 15, 2020

(30) Foreign Application Priority Data

Apr. 10, 2019  (CN) .......................... 201910282492.0

(51) Int. Cl.
*H01Q 1/24*    (2006.01)
*H01Q 5/50*    (2015.01)
*H01Q 21/00*   (2006.01)
*H04B 1/00*    (2006.01)

(52) U.S. Cl.
CPC ............ *H01Q 1/246* (2013.01); *H01Q 5/50* (2015.01); *H01Q 21/0025* (2013.01); *H04B 1/0057* (2013.01)

(58) Field of Classification Search
CPC ...... H01Q 1/246; H01Q 5/50; H01Q 21/0025; H04B 1/0057
See application file for complete search history.

(56) References Cited

U.S. PATENT DOCUMENTS

| | | | |
|---|---|---|---|
| 6,356,233 B1* | 3/2002 | Miller | H01Q 3/267 342/174 |
| 9,831,548 B2* | 11/2017 | Timofeev | H01Q 3/30 |
| 2014/0225792 A1* | 8/2014 | Lee | H01Q 21/30 343/729 |
| 2014/0242930 A1 | 8/2014 | Barker et al. | |
| 2015/0357721 A1* | 12/2015 | Zimmerman | H01Q 21/30 343/853 |

(Continued)

FOREIGN PATENT DOCUMENTS

CN    206461086    9/2017

OTHER PUBLICATIONS

Extended European Search Report corresponding to European Patent Application No. 20168939.5 (7 pages) (dated Aug. 19, 2020).

*Primary Examiner* — Nguyen T Vo
(74) *Attorney, Agent, or Firm* — Myers Bigel, P.A.

(57) ABSTRACT

Base station antennas include a first array of radiating elements that is coupled to a first RF port through a first feed network, a second array of radiating elements that is coupled to a second RF port through a second feed network, and first and second circuit elements. The first circuit element has a first port coupled to the first feed network, a second port coupled to a first port of the second circuit element and a third port coupled to a first radiating element of the first array of radiating elements. The second circuit element has a second port coupled to a first radiating element of the second array of radiating elements and a third port coupled to the second feed network.

17 Claims, 13 Drawing Sheets

(56) References Cited

U.S. PATENT DOCUMENTS

| | | | |
|---|---|---|---|
| 2015/0372396 A1* | 12/2015 | Sienkiewicz | H04B 1/401 455/77 |
| 2017/0294715 A1 | 10/2017 | Wu et al. | |
| 2018/0026380 A1 | 1/2018 | Powell | |
| 2018/0294578 A1* | 10/2018 | Xiao | H01Q 1/246 |
| 2018/0375220 A1* | 12/2018 | Mei | H01Q 1/246 |
| 2019/0028159 A1* | 1/2019 | Bisiules | H01Q 1/246 |

\* cited by examiner

US 11,031,678 B2

BASE STATION ANTENNAS HAVING ARRAYS WITH FREQUENCY SELECTIVE SHARED RADIATING ELEMENTS

CROSS-REFERENCE TO RELATED APPLICATION

The present application claims priority to Chinese Patent Application Serial No. 201910282492.0, filed Apr. 10, 2019, the entire content of which is incorporated herein by reference.

FIELD

The present invention relates to radio communications and, more particularly, to base station antennas for cellular communications.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular to the horizontal plane that is defined by the horizon. Reference will also be made to the azimuth plane, which is a horizontal plane that bisects the base station antenna, and to the elevation plane, which is a plane extending along the boresight pointing direction of the antenna that is perpendicular to the azimuth plane.

A common base station configuration is the "three sector" configuration in which a cell is divided into three 120° sectors in the azimuth plane. A base station antenna is provided for each sector. In a three sector configuration, the antenna beams generated by each base station antenna typically have a Half Power Beamwidth ("HPBW") in the azimuth plane of about 65° so that each antenna beam provides good coverage throughout a 120° sector. Three of these base station antennas will provide full 360° coverage in the azimuth plane. Typically, each base station antenna will include a so-called "linear array" of radiating elements that includes a plurality of radiating elements that are arranged in a vertically-extending column. Each radiating element may have an azimuth HPBW of approximately 65° so that the antenna beam generated by the linear array will have a HPBW of about 65' in the azimuth plane. By providing a column of radiating elements extending along the elevation plane, the HPBW of the antenna beam in the elevation plane may be narrowed to be significantly less than 65°, with the amount of narrowing increasing with the length of the column in the vertical direction.

As demand for cellular service has grown, cellular operators have upgraded their networks to support new generations of service. When these new services are introduced, the existing "legacy" services typically must be maintained to support legacy mobile devices. Thus, as new services are introduced, either new cellular base stations must be deployed or existing cellular base stations must be upgraded to support the new services. In order to reduce cost, many cellular base stations support two, three, four or more generations of cellular service. However, due to local zoning ordinances and/or weight and wind loading constraints, there is often a limit as to the number of base station antennas that can be deployed at a given base station. To reduce the number of antennas, many operators deploy antennas that communicate in multiple frequency bands to support multiple different cellular services.

There is considerable interest in base station antennas that include two linear arrays of radiating elements that are used to provide service in some or all of the 1427-2690 MHz frequency band, which is often referred to as the "raid-band" frequency range. The two linear arrays of radiating elements are typically mounted in side-by-side fashion. FIG. 1 is a schematic front view of a conventional base station antenna 10 that includes first and second columns 12-1, 12-2 of radiating elements 16. Each radiating element 16 is depicted in FIG. 1 (and others of the figures herein) as an "X" to show that the radiating elements are dual-polarized cross-dipole radiating elements. Each column 12-1, 12-2 of radiating elements 16 forms a respective linear array 14-1, 14-2 of radiating elements 16. Antennas having the configuration shown in FIG. 1 may be used in a variety of applications including 4×MIMO (i.e., multi-input-multi-output) applications or as multi-band antennas that support cellular service in two different sub-bands within the 1427-2690 MHz frequency band (e.g., the linear arrays 14-1, 14-2 may operate in different, non-overlapping ones of, for example, the 1427-1518 MHz, 1710-1880 MHz, 1850-1995 MHz, 1695-2180 MHz, 2300-2400 MHz, 2496-2690 MHz and 2300-2690 MHz frequency sub-bands). In some cases, the linear arrays 14-1, 14-2 may be the only arrays included in the base station antenna 10, while in other cases one or more additional arrays of radiating elements (not shown) that operate in other frequency bands such as some or all of the low-band frequency range (which extends from 617-960 MHz) or the high-band frequency range (which may include the 3-4-3.8 GHz and/or the 5.1-5.8 GHz frequency bands) may also be included in antenna 10.

It should be noted that herein, when multiple like or similar elements are provided, they may be labelled in the drawings using a two-part reference numeral (e.g., arrays 14-1, 14-2). Such elements may be referred to herein individually by their full reference numeral (e.g., array 14-2) and may be referred to collectively by the first part of their reference numeral (e.g., the arrays 14).

SUMMARY

Pursuant to embodiments of the present invention, base station antennas are provided that include first and second RF ports, a first array of radiating elements that is coupled to the first RF port through a first feed network, a second array of radiating elements that is coupled to the second RF port through a second feed network, and first and second circuit elements. The first circuit element has a first port coupled to the first feed network, a second port coupled to a first port of the second circuit element, and a third port coupled to a first radiating element of the first array of radiating elements, and the second circuit element has a second port coupled to a first radiating element of the second array of radiating elements and a third port coupled to the second feed network.

In some embodiments, the first radiating element of the first array of radiating elements may also be part of the second array of radiating elements.

In some embodiments, the second circuit element may be a diplexer. In other embodiments, the second circuit element may be a power divider with a filter on a first output port thereof.

In any of the above embodiments, the first circuit element may be a diplexer.

In some embodiments, the first array of radiating elements may consist of a first column of radiating elements and the second array of radiating elements may consist of a second column of radiating elements and one or more radiating elements of the first array of radiating elements including the first radiating element of the first array of radiating elements. In such embodiments, the first column of radiating elements may be horizontally offset from the second column of radiating elements.

In some embodiments, the first array of radiating elements may be configured to operate in a first frequency range and the second array of radiating elements may be configured to operate in a second frequency range that partially, but not completely, overlaps with the first frequency range.

In some embodiments, the second circuit element may be configured to pass signals input at the second RF port that are in a portion of the second frequency range that overlaps with the first frequency range to the first radiating element of the second array of radiating elements and to pass signals input at the second RF port that are in a portion of the second frequency range that does not overlap with the first frequency range to the first circuit element.

In some embodiments, the first circuit element may be configured to pass signals input at the second RF port that are in the portion of the second frequency range that does not overlap with the first frequency range to the first radiating element of the first array of radiating elements.

In some embodiments, the first array of radiating elements may be configured to operate in some or all of the 1695-2690 MHz frequency band but not in the 1427-1518 MHz frequency band, while the second array of radiating elements may be configured to operate in some or all of the 1427-2690 MHz frequency band including at least a portion of the 1427-1518 MHz frequency band and at least a portion of the 1695-2690 MHz frequency band.

In some embodiments, the base station antenna may further include a third circuit element and a fourth circuit element, where the third circuit element has a first port coupled to the second feed network via the second circuit element, a second port coupled to a first radiating element of the second array of radiating elements and a third port coupled to the first feed network via a first port of the fourth circuit element, and the fourth circuit element has a second port coupled to the first feed network and a third port coupled to the first radiating element of the second array of radiating elements through the first circuit element.

In some embodiments, the third circuit element may be a diplexer and the fourth circuit element may be a diplexer or a low pass filter.

Pursuant to further embodiments of the present invention, base station antennas are provided that include first and second RF ports, a first plurality of radiating elements that are coupled to the first RF port through a first feed network, where the first plurality of radiating elements are arranged in a first column and form a first array of radiating elements, and a second plurality of radiating elements that are coupled to the second RF port through a second feed network, where the second plurality of radiating elements are arranged in a second column. In these base station antennas, a first of the radiating elements in the first column is further coupled to the second RF port through the second feed network, and the radiating elements in the second column and the first of the radiating elements in the first column comprise a second array of radiating elements.

In some embodiments, the first array of radiating elements may be configured to operate in some or all of the 1695-2690 MHz frequency band but not in the 1427-1518 MHz frequency band, while the second array of radiating elements may be configured to operate in some or all of the 1427-2690 MHz frequency band including at least a portion of the 1427-1518 MHz frequency band and at least a portion of the 1695-2690 MHz frequency band.

In some embodiments, the base station antenna further includes a first circuit element that has a first port coupled to the first feed network, a second port coupled to the second feed network and a third port coupled to the first of the radiating elements in the first column.

In some embodiments, the base station antenna further includes a second circuit element that has a first port coupled to the second port of the first circuit element, a second port coupled to a first of the radiating elements in the second column and a third port coupled to the second feed network.

In some embodiments, the second circuit element may be a diplexer or a low pass filter.

In some embodiments, the first circuit element may be a diplexer.

In some embodiments, the first column may be horizontally offset from the second column.

In some embodiments, the first array of radiating elements may be configured to operate in a first frequency range and the second array of radiating elements may be configured to operate in a second frequency range that only partially overlaps with the first frequency range.

In some embodiments, the first circuit element may be configured to pass signals input at the second RF port that are in a portion of the second frequency range that does not overlap with the first frequency range to the first of the radiating elements in the first array of radiating elements.

Pursuant to still further embodiments of the present invention, base station antennas are provided that include first and second RF ports, a first vertical column of radiating elements, and a second vertical column of radiating elements that is horizontally offset from the first vertical column of radiating elements. More than half of the radiating elements in the first vertical column of radiating elements are part of a first array of radiating elements that is coupled to the first RF port through a first feed network, and more than half of the radiating elements in the second vertical column of radiating elements are part of a second array of radiating elements that is coupled to the second RF port through a second feed network. The second array of radiating elements includes a first number of the radiating elements in the first column for RF signals that are within a first frequency range and a second number of the radiating elements in the first column for RF signals that are within a second frequency range that is lower than the first frequency range, the second number being larger than the first number.

In some embodiments, the first number may be zero.

In some embodiments, the second array of radiating elements may include a third number of the radiating elements in the first column for RF signals that are within a third frequency range that is lower than the second frequency range, the third number being larger than the second number.

DETAILED DESCRIPTION

Figure 1:
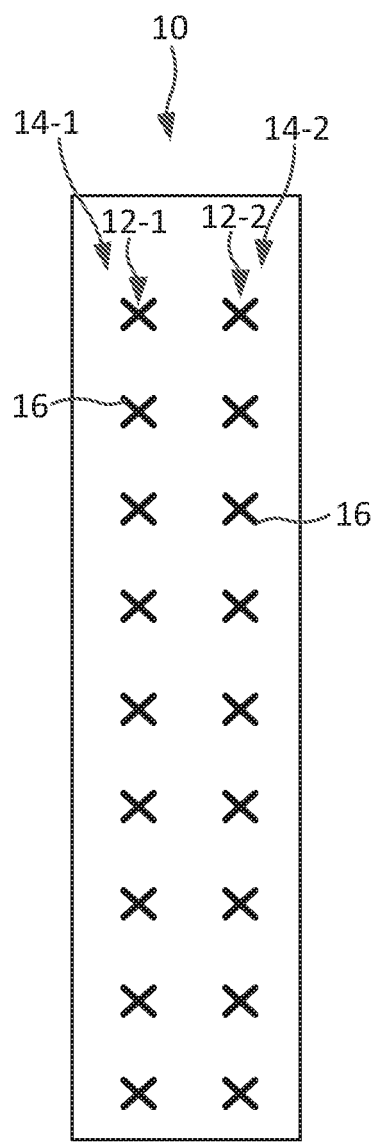
FIG. 1 is a schematic front view of a conventional base station antenna that includes two linear arrays of radiating elements.

One challenge in designing base station antennas is that the azimuth beam width of a radiating element tends to vary as a function of frequency, with the azimuth beamwidth being wider when the radiating element operates at lower frequencies and narrower when the radiating element operates at higher frequencies. For operating frequency ranges such as the traditional low-band frequency range (690-960 MHz), this was not a significant problem as the operating frequency range was not all that broad. More difficulties were encountered in designing base station antennas with linear arrays that could operate over the full extent of the traditional mid-band operating frequency range (1695-2690 MHz), although eventually suitable designs were developed. Recently, however, the 1427-1518 MHz frequency band has been opened for cellular service, and hence there is now demand for base station antennas having arrays of radiating elements that can operate across the full 1427-2690 MHz frequency band. Unfortunately, it is a significant challenge to design arrays of radiating elements that will operate over the full frequency range and that will have suitable azimuth beamwidths at both the lower and upper ends of the operating frequency range.

Pursuant to embodiments of the present invention, base station antennas are provided that have two or more arrays of radiating elements that share one or more radiating elements. The shared radiating element(s) may be used to reduce the azimuth beamwidth of one or both of the arrays, with the amount of reduction in the azimuth beamwidth being frequency dependent. In particular, the reduction in azimuth beamwidth may be relatively large in a lower portion of the operating frequency band and may be relatively small (or non-existent) in an upper portion of the operating frequency band. Consequently, the shared radiating element(s) may be used to offset the natural tendency of the azimuth beamwidth to increase with decreasing frequency, thereby allowing the antenna beam to have less variation as a function of frequency. As a result, the base station antennas according to embodiments of the present invention may include one or more linear arrays that may be used to support cellular service over any portion of the full 1427-2690 MHz frequency band while having suitable azimuth beamwidths across the entire frequency band. Moreover, while the disclosure below will focus on base station antennas having mid-band arrays that operate in the 1427-2690 MHz frequency band (or portions thereof), it will be appreciated that these same techniques may be used, for example, in low-band or high-band arrays to either extend the operating frequency band of those arrays and/or to reduce the amount of variation in the azimuth beamwidth over the operating frequency range.

The base station antennas according to embodiments of the present invention may share a radiating element of a first linear array with an adjacent second linear array. The shared radiating element is horizontally offset from the second linear array and hence may be used to narrow the azimuth beamwidth of the second linear array. The shared radiating element may be coupled to the feed network for the second linear array through a frequency dependent circuit element such as a diplexer so that the shared radiating element will only substantially contribute to the antenna beam formed by the second array for RF signals in selected (typically lower) frequency sub-bands. By sharing one or more of the radiating elements of the first array with the second array, but only for certain frequency sub-bands, the azimuth beamwidth of the antenna beams formed by the second array may vary less as a function of frequency, and hence the base station antenna may form antenna beams having suitable shapes across the entire 1427-2690 MHz (or other) frequency band.

In some embodiments of the present invention, base station antennas are provided that include a first array of radiating elements that is coupled to a first RF port through a first feed network, a second array of radiating elements that is coupled to a second RF port through a second feed network, and first and second circuit elements. The first circuit element has a first port coupled to the first feed network, a second port coupled to a first port of the second circuit element, and a third port coupled to a first radiating element of the first array of radiating elements. The second circuit element has a second port coupled to a first radiating element of the second array of radiating elements and a third port coupled to the second feed network. The first circuit element may comprise, for example, a diplexer. The second circuit element may comprise, for example, a diplexer or a low pass or band pass filter.

In other embodiments, base station antennas are provided that include a first plurality of radiating elements that are coupled to a first RF port through a first feed network, where the first plurality of radiating elements are arranged in a first column and form a first array of radiating elements, and a second plurality of radiating elements that are coupled to a second RF port through a second feed network, where the second plurality of radiating elements are arranged in a second column. A first of the radiating elements in the first column is further coupled to the second RF port through the second feed network, and the radiating elements in the second column and the first of the radiating elements in the first column comprise a second array of radiating elements. Each of the above-described base station antennas may include a second array of radiating elements that includes a first column of radiating elements as well as one or more horizontally offset "shared" radiating elements that are part of both the second array of radiating elements as well as being part of a first array of radiating elements.

Figure 2A:
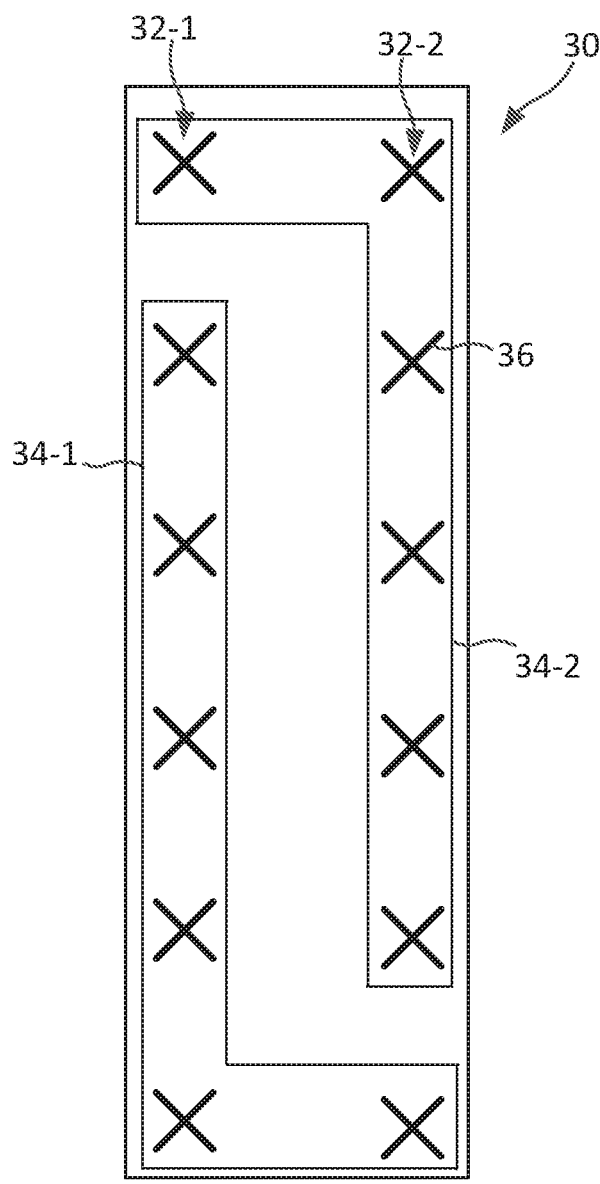
FIGS. 2A-2C are schematic front views of several conventional base station antennas that have arrays of dual-polarized cross-dipole radiating elements that have increased horizontal apertures that generate antenna beams having reduced azimuth HPBWs.
Figure 2B:
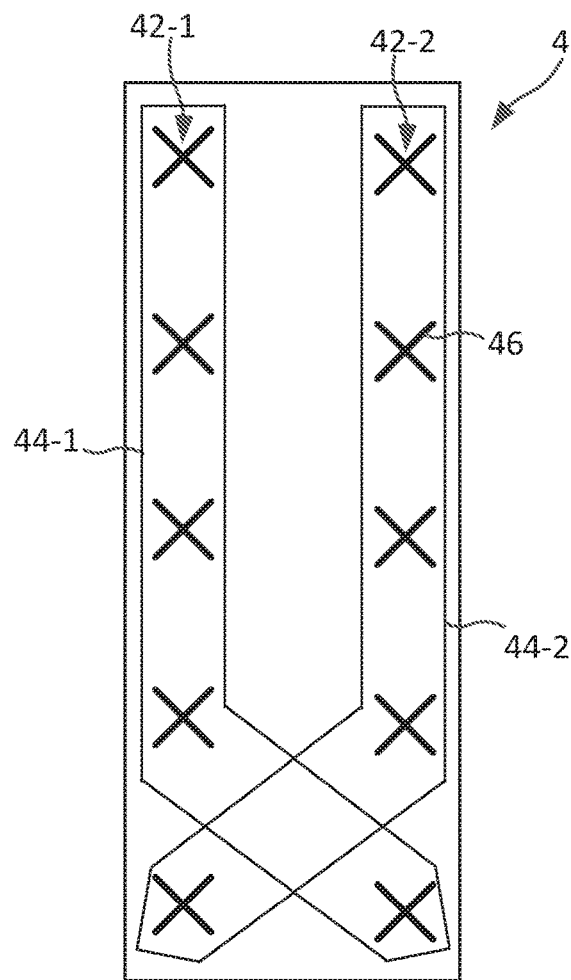
Figure 2C:
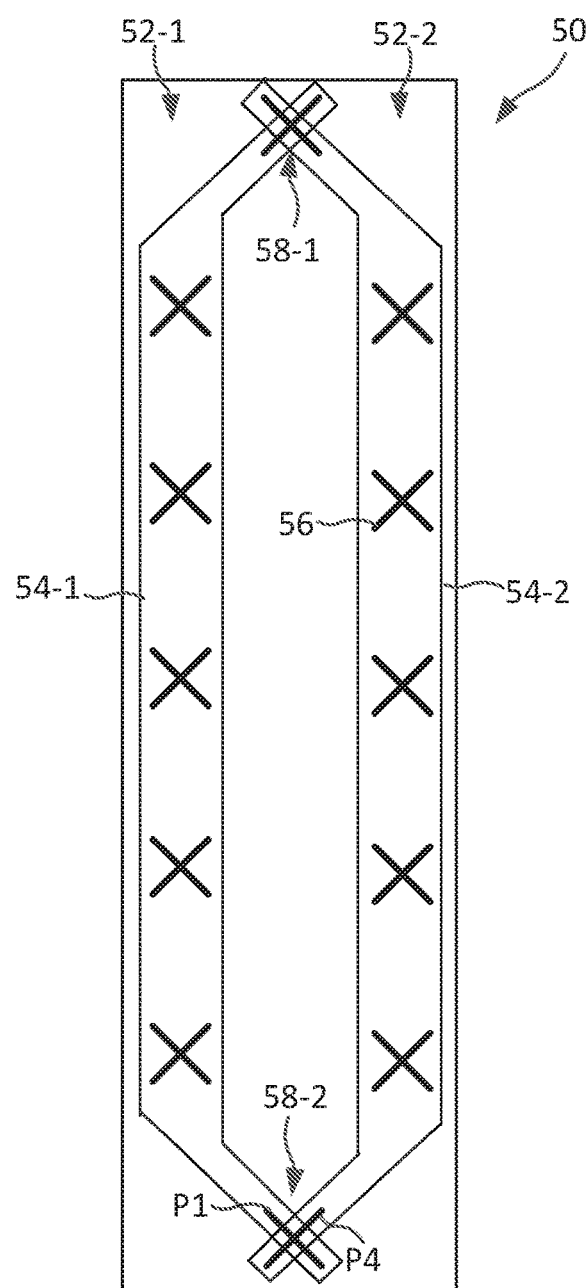

Base station antennas have been previously suggested that include antenna arrays that comprise a linear array of radiating elements plus one or more additional radiating elements that are horizontally offset from the linear array. Such arrays have typically been employed to narrow the width of the antenna, since the horizontally offset radiating elements act to narrow the azimuth beamwidth of the array, thereby allowing smaller radiating elements to be used while still achieving, for example, a 65c azimuth HPBW. FIGS. 2A-2C are schematic views of three base station antennas that each include two arrays of radiating elements where each array includes a linear array of radiating elements plus a horizontally offset radiating element.

Referring first to FIG. 2A, a conventional base station antenna 30 is depicted that includes first and second columns 32-1, 32-2 of radiating elements 36. The base station antenna 30 may be identical to the base station antenna 10 of FIG. 1, except that (1) it includes fewer radiating elements 36 (and hence has a wider elevation HPBW) and (2) the radiating elements 36 are grouped differently to form the two arrays 34-1, 34-2. To help highlight which radiating elements 36 form each array 34-1, 34-2, polygons have been drawn around each array 34. The first array 34-1 includes the bottom five radiating elements 36 in the left-hand column 32-1 as well as the bottom radiating element 36 in the right-hand column 32-2, while the second array 34-2 includes the top five radiating elements 36 in the right-hand column 32-2 as well as the top radiating element 36 in the left-hand column 32-1. Thus, the first array 34-1 has an L shape and the second array 34-2 has an upside-down L-shape. Since each array 34-1, 34-2 includes a radiating element 36 that is in the opposite column 32-2, 32-1, respectively, the horizontal aperture of each array 34-1, 34-2 is increased, with a commensurate reduction in the azimuth beamwidth. One disadvantage, however, of this design is that it requires adding an extra radiating element 36 to each column 32-1, 32-2 (to allow one row of each array to include two radiating elements 36), which increases the length and cost of the antenna 30 without providing any reduction in the elevation beam width and/or any appreciable increase in the gain of the antenna 30.

FIG. 2B is a schematic front view of a conventional base station antenna 40 that increases the horizontal aperture without the need for adding an extra radiating element in each column. The base station antenna 40 includes two columns 42-1, 42-2 of radiating elements 46 that form first and second so-called "Y-shaped" arrays 44-1, 44-2 (note that each array 44 is one radiating element short of having a true "Y-shape"). The base station antenna 40 is similar to the base station antenna 10 of FIG. 1, except that it again includes fewer radiating elements 46 and the bottom radiating element 46 in each column 42-1, 42-2 is switched to be part of the array 44 formed by the rest of the radiating elements 46 in the opposite column 42-1, 42-2. Since each array 44-1, 44-2 includes a radiating element 46 that is in the opposite column 42-1, 42-2, the horizontal aperture of each array 44-1, 44-2 is increased, with a commensurate reduction in the azimuth beamwidth. Moreover, the base station antenna 40 does not include two radiating elements 46 in any row, and hence does not suffer from the cost and size disadvantages associated with base station antenna 30. A disadvantage, however, of the design of base station antenna 40 is that the physical distance between the bottom two radiating elements 46 in each array 44-1, 44-2 is increased (since the physical distance is taken along a diagonal as opposed to simply being the vertical distance between the two radiating elements 46), and this results in off-axis grating lobes in the resultant radiation patterns formed by the first and second arrays 44-1, 44-2. These grating lobes reduce the gain of the antenna 40, and may also result in interference with neighboring base stations.

FIG. 2C is a schematic front view of another conventional base station antenna 50 that has arrays with increased horizontal apertures. The base station antenna 50 is disclosed in U.S. Pat. No. 8,416,142 to Göttl. As shown in FIG. 2C, the base station antenna 50 includes first and second columns 52-1, 52-2 of dual-polarized cross-dipole radiating elements 56. The radiating elements 56 in the left-hand column 52-1 are part of a first array 54-1, and the radiating elements 56 in the right-hand column 52-2 are part of a second array 54-2. The antenna 50 further includes first and second centrally located radiating elements 58-1, 58-2, which may be identical in design to the radiating elements 56. One dipole radiator of each centrally-located radiating element 58-1, 58-2 is part of the first array 54-1 and the other dipole radiator of each centrally-located radiating element 58-1, 58-2 is part of the second array 54-2. Thus, the first array 54-1 includes six dipole radiators for each polarization (namely the five dipole radiators at each polarization included in the radiating elements in the first column 52-1, the +45° dipole radiator of centrally-located radiating elements 58-1, and the −45° dipole radiator of centrally-located radiating element 58-2). Likewise, the second array 54-2 includes six dipole radiators for each polarization (namely the five dipole radiators at each polarization included in the radiating elements in the second column 52-2, the −45° dipole radiator of centrally-located radiating element 58-1, and the +45° dipole radiator of centrally-located radiating element 58-2). The centrally-located radiating elements 58-1, 58-2 act to narrow the azimuth beamwidth by increasing the horizontal aperture of each array 54-1, 54-2, thereby allowing for reduction in the size of the individual radiating elements 56, 58.

Embodiments of the present invention will now be discussed in more detail with reference to the remaining figures.

Figure 3A:
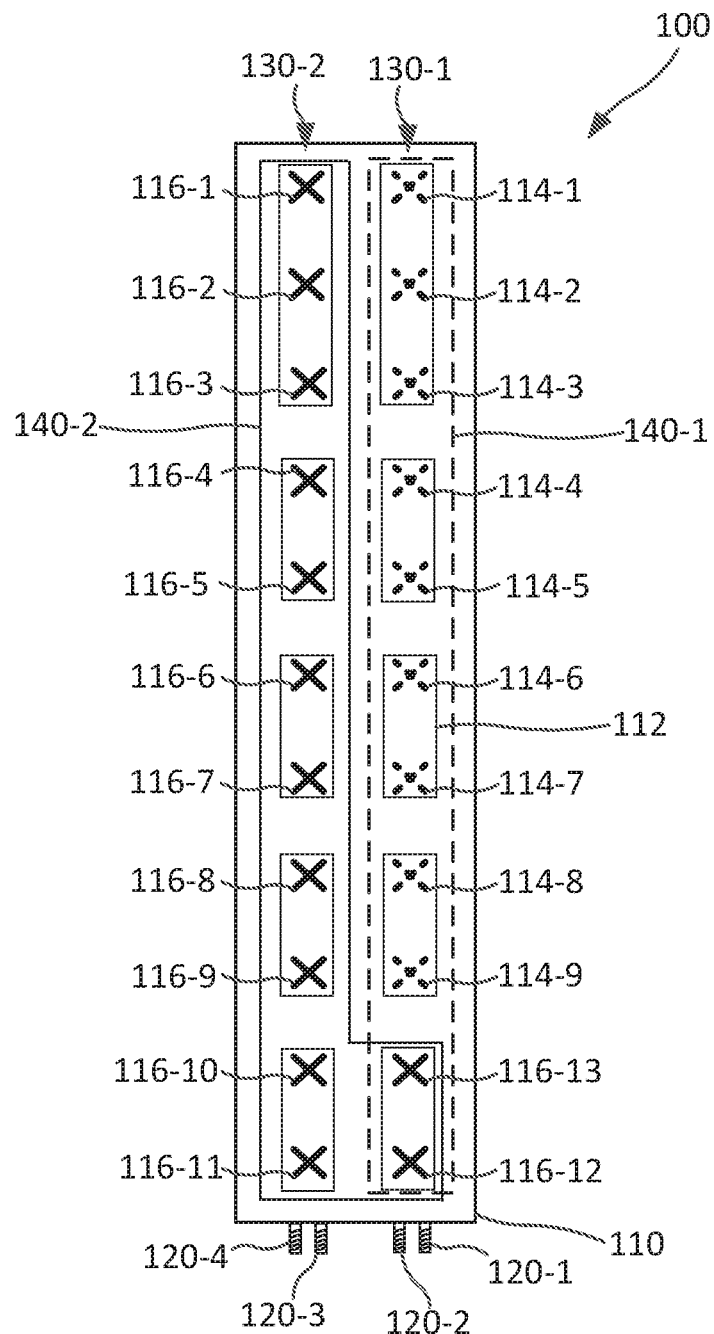
FIG. 3A is a schematic front view of a base station antenna according to embodiments of the present invention.
Figure 3B:
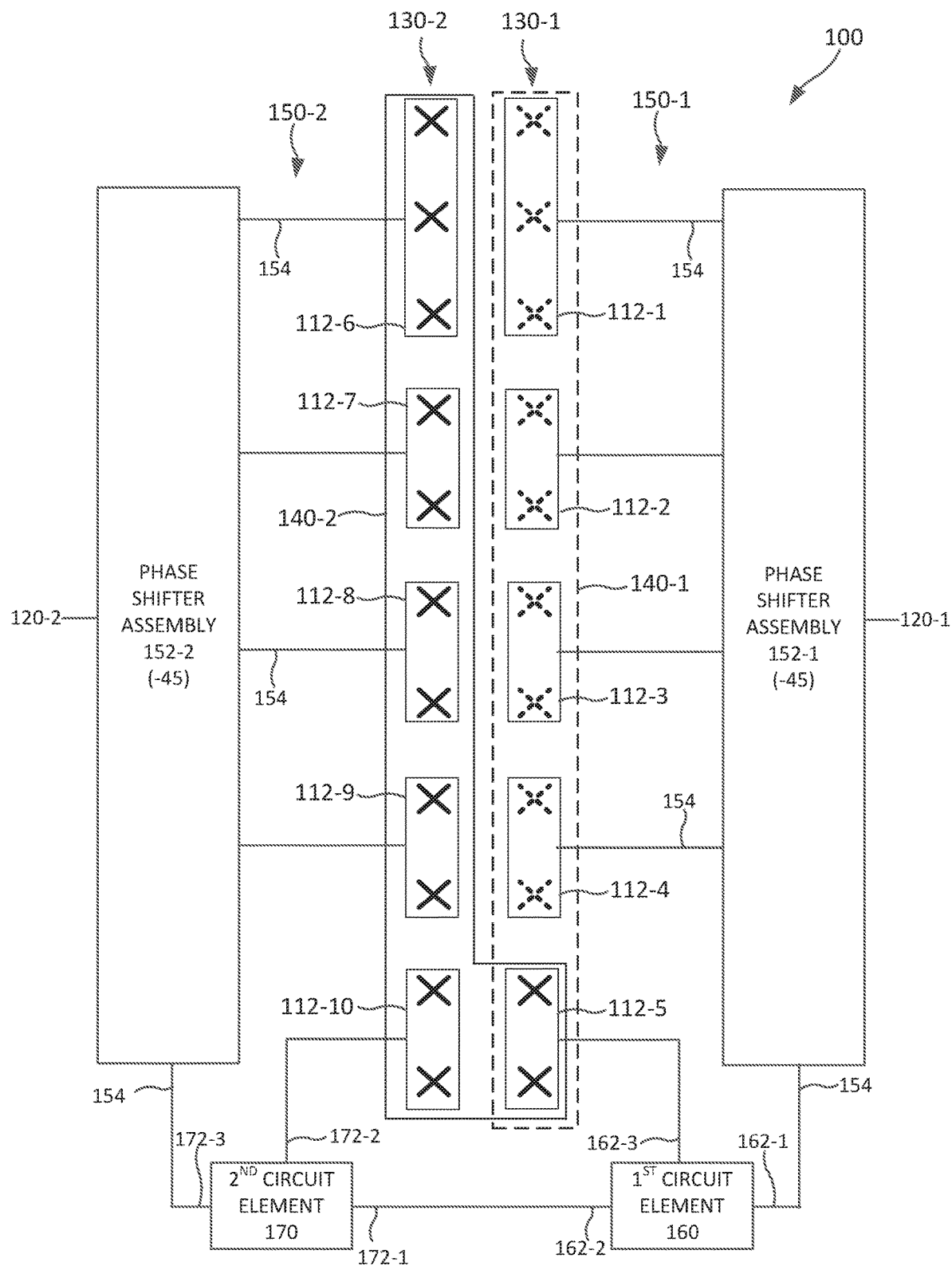
FIG. 3B is a schematic block diagram illustrating the feed networks for the base station antenna of FIG. 3A.

FIG. 3A is a schematic front view of a base station antenna 100 according to embodiments of the present invention. FIG. 3B is a schematic block diagram illustrating the feed networks for the base station antenna 100 of FIG. 3A.

As shown in FIG. 3A, the base station antenna 100 includes a plurality of radiating elements 114, 116 that are mounted to extend forwardly from a reflector 110. The base station antenna 100 further includes first through fourth RF ports 120-1 through 120-4. The radiating elements 114, 116 are mounted to form first and second vertically-extending columns 130-1, 130-2 of radiating elements 120. Radiating elements 114-1 through 114-9 along with radiating elements 116-12 and 116-13 form a first array 140-1 of radiating elements (array 140-1 is outlined in a dashed box in FIG. 3B). Radiating elements 116-1 through 116-13 form a second array 140-2 of radiating elements (array 140-2 is outlined in a solid box in FIG. 3B). As shown in FIG. 3A, the first array 140-1 is a vertically extending linear array of radiating elements while the second array 140-2 is a generally "L-shaped" array of radiating elements. As shown in FIG. 3A, radiating elements 116-12 and 116-13 are shared radiating elements that are part of both the first array 140-1 and the second array 140-2.

Each radiating element 114, 116 may comprise, for example, a dual-polarized slant −45°/+45° cross-dipole radiating element. Embodiments of the present invention, however, are not limited to such radiating elements, and it will be appreciated that other radiating elements such as single-polarization dipole radiating elements, single-polarization and/or dual-polarization patch radiating elements, box dipole radiating elements, loop radiating elements and the like may be used in place of the dual-polarized slant −45°/+45° cross-dipole radiating elements 114, 116 that are schematically illustrated in FIG. 3A using large X's (the radiating elements 114 are shown using dashed X's to more clearly distinguish the two different types of radiating elements). It will also be appreciated that the same type of radiating elements may be used to implement the radiating elements 114 and the radiating elements 116, or that a first type of radiating elements may be used to implement the radiating elements 114 and a second, different type of radiating element may be used to implement the radiating elements 116. In some embodiments, the radiating elements 116 may be designed to operate in a first frequency range (e.g., the 1427-2690 MHz frequency band) while the radiating elements 114 may be designed to operate in only a portion of the first frequency range that is at the higher end of the frequency range (e.g., the 1695-2690 MHz frequency band). In such embodiments, it may be possible to use smaller, less expensive radiating elements to implement the radiating elements 114 (as compared to the radiating elements 116).

While a total of nine radiating elements 114 and a total of thirteen radiating elements 116 are shown in FIG. 3A, it will be appreciated that any appropriate number of radiating elements 114, 116 may be included in base station antenna 100. Moreover, the first and second columns 130-1, 130-2 need not include the same number of radiating elements, although in many cases it may be advantageous for the two columns 130 to include the same number of radiating elements. The number of radiating elements 114, 116 included in each column 130 may be selected, for example, to meet specified gain and/or elevation beamwidth requirements. Moreover, while the base station antenna 100 is illustrated as having a total of two arrays 140 of radiating elements, it will be appreciated that additional arrays of radiating elements (not shown) may be included on the antenna 100. For example, one or more arrays of low-band radiating elements, one or more arrays of high-band radiating elements, and/or one or more additional arrays of mid-band radiating elements may be included in some embodiments.

In FIG. 3A, the base station antenna 100 is shown as including two shared radiating elements 116-12, 116-13 that are located at the bottom of the first column 130-1 of radiating elements. It will be appreciated, however, that embodiments of the present invention are not limited thereto. In other embodiments, a single shared radiating element or more than two shared radiating element may be included in the antenna 100. For example, only the bottom radiating element 116-12 in the first column 130-1 could be a shared radiating element. Likewise, instead of sharing one or more radiating elements that are at the bottom of a column 130, one or more radiating elements 116 could be shared between the first and second arrays 140-1, 140-2 that is/are at the top a column 130 and/or in a middle portion of a column 130. When multiple shared radiating elements are provided, they may or may not be adjacent each other in a column 130.

FIG. 3B is a schematic block diagram of the base station antenna 100 of FIG. 3A that illustrates two of the feed networks 150 thereof. As shown in FIG. 3B, feed network 150-1 is used to pass RF signals between the first RF port 120-1 and the radiating elements 114-1 through 114-9 and 116-12 and 116-13 that are included in the first array 140-1, while feed network 150-2 is used to pass RF signals between the second RF port 120-2 and the radiating elements 116-1 through 116-13 that are included in the second array 140-2. In each case, the RF signals are passed to the −45° radiators of the radiating elements 114, 116. In FIG. 3B, only the feed networks 150-1, 150-2 for the −45° RF ports 120-1, 120-2 are shown, and the feed networks 150 for the +45° RF ports 120-3, 120-4 are omitted to simplify the drawing. It will be appreciated that the feed networks 150 for the +45° RF ports 120-3, 120-4 may be identical to feed networks 150-1, 150-2, respectively, except that the feed networks 150 for the +45° RF ports 120-3, 120-4 connect to the +45° dipole radiators of the radiating elements 114, 116 in the arrays 140-1, 140-2, whereas the feed networks 150-1, 150-2 connect to the −45° dipole radiators of the radiating elements 114, 116.

In the description that follows, various ports of the phase shifters 152 and other circuit elements may be referred to as being "input ports" or "output ports." The "input" and "output" labels are made under the assumption that an RF signal that is to be transmitted by base station antenna 100 (a "transmit RF signal") is passing through one of the feed networks 150. It will be appreciated that with respect to RF signals received by base station antenna 100 each "output port" will operate as an input port and each "input port" will operate as an output port due to the bidirectional nature of the RF signals passed through base station antenna 100.

The first feed network 150-1 includes a first phase shifter assembly 152-1 that has an input that is coupled to the first RF port 120-1 and five outputs 154. Each phase shifter assembly 152 may include a power splitter/combiner and a phase shifter (not shown separately). The power splitter/ combiner may be a component that divides an RF transmit signal into a plurality of sub-components and that combines a plurality of sub-components of a received RF signal into a single combined RF signal. The phase shifter may be a component that imparts a phase taper to the various components of the transmit and receive RF signals. The phase shifter may be an adjustable phase shifter that can be remotely controlled to vary the amount of phase taper applied to the transmit and receive RF signals in order to impart a desired amount of electrical downtilt to the antenna beam. Suitable phase shifter assemblies are disclosed, for example, in U.S. Patent Publication No. 2017/0365923, the entire content of which is incorporated herein by reference.

RF signals input at RF port 120-1 enter the phase shifter assembly 152-1 at the input port thereof and are divided into five sub-components by the power splitter/combiner that is integrated into the phase shifter assembly 152-1. The phase shifter assembly 152-1 may be adjusted to apply a phase taper to the five sub-components of the RF signal in order to apply a desired amount of electronic downtilt to the elevation angle of the antenna beam formed by the first array 140-1. Each output 154 of phase shifter assembly 152-1 is coupled to a sub-array 112 of the radiating elements 114, 116. In particular, the first output 154 is coupled to a first sub-array 112-1 that includes radiating elements 114-1 through 114-3, the second output 154 is coupled to a second sub-array 112-2 that includes radiating elements 114-4 and 114-5, the third output 154 is coupled to a third sub-array 112-3 that includes radiating elements 114-6 and 114-7, the fourth output 154 is coupled to a fourth sub-array 112-4 that includes radiating elements 114-8 and 114-9, and the fifth output 154 is coupled to a fifth sub-array 112-5 that includes radiating elements 116-12 and 116-13. As is further shown in FIG. 3B, the fifth output 154 of phase shifter assembly 150-1 is coupled to the fifth sub-array 112-5 through a first circuit element 160. The first circuit element 160 may be a frequency selective device such as, for example, a diplexer or other multiplexer.

The second feed network 150-2 includes a second phase shifter assembly 152-2 that has an input that is coupled to the second RF port 120-2 and five outputs 154. RF signals input at RF port 120-2 enter the phase shifter assembly 152-2 at the input port thereof and are divided into five sub-components by a power splitter/combiner that is integrated into the phase shifter assembly 152-2. The phase shifter assembly 152-2 may be adjusted to apply a phase taper to the five sub-components of the RF signal in order to electronically downtilt the elevation angle of the antenna beam formed by the second array 140-2. Each output 154 of phase shifter assembly 152-2 is coupled to a respective sub-array 112 of the radiating elements 116. In particular, the first output 154 is coupled to a sixth sub-array 112-6 that includes radiating elements 116-1 through 116-3, the second output 154 is coupled to a seventh sub-array 112-7 that includes radiating elements 116-4 and 116-5, the third output 154 is coupled to an eighth sub-array 112-8 that includes radiating elements 116-6 and 116-7, the fourth output 154 is coupled to a ninth sub-array 112-9 that includes radiating elements 116-8 and 116-9, and the tenth output 154 is coupled to a tenth sub-array 112-10 that includes radiating elements 116-10 and 116-11 and is also coupled to the fifth sub-array 112-5 that includes radiating elements 116-12 and 116-13. As is shown in FIG. 3B, the fifth output 154 of phase shifter assembly 152-2 is coupled to the fifth and tenth sub-arrays 112-5, 112-10 through a second circuit element 170. The second circuit element 170 may also be a frequency selective device such as, for example, a diplexer or other multiplexer or a power divider that has a filter such as a low-pass or band-pass filter on one of the output legs thereof.

The first circuit element 160 and the second circuit element 170 may be configured to allow the radiating elements 116-12 and 116-13 to be shared by the first and second arrays 140-1, 140-2 in a frequency-selective fashion. In one example embodiment, the first circuit element 160 may be a diplexer having first and second frequency selective ports 162-1, 162-2 and a "common" port 162-3. As discussed above, the first array 140-1 of base station antenna 100 is designed to transmit and receive RF signals in the 1695-2690 MHz frequency band, while the second array 140-2 is designed to transmit and receive RF signals in the 1427-1518 MHz and 1695-2690 MHz frequency bands. The first frequency selective port 162-1 of diplexer 160 is thus configured to pass RF signals in the 1695-2690 MHz frequency band, but to block RF signals in the 1427-1518 MHz frequency band. The second frequency selective port 162-2 of diplexer 160 is configured to pass RF signals in the 1427-1518 MHz frequency band, but to block RF signals in the 1695-2690 MHz frequency band. The "common" port 162-3 is configured to pass RF signals in both the 1427-1518 MHz and 1695-2690 MHz frequency bands.

In some embodiments, the second circuit element 170 may likewise be implemented as a diplexer having first and second frequency selective ports 172-1, 172-2 and a "common" port 172-3. The first frequency selective port 172-1 of diplexer 170 is configured to pass RF signals in the 1427-1518 MHz frequency band, but to block RF signals in the 1695-2690 MHz frequency band. The second frequency selective port 172-2 of diplexer 170 is configured to pass RF signals in the 1695-2690 MHz frequency band, but to block RF signals in the 1427-1518 MHz frequency band. The "common" port 172-3 of diplexer 170 is configured to pass RF signals in both the 1427-1518 MHz and 1695-2690 MHz frequency bands.

The base station antenna 100 may operate as follows. A first RF signal that is within the 1695-2690 MHz frequency band may be input at RF port 120-1. The first RF signal is divided into five sub-components and phase shifted by the phase shifter assembly 152-1. The first through fourth sub-components of the RF signal are passed to the respective sub-arrays 112-1 through 112-4 where the sub-components are radiated by radiating elements 114-1 through 114-9. The fifth sub-component is passed to port 162-1 of diplexer 160. Since the sub-component is within the 1695-2690 MHz "pass-band" of port 162-1, the fifth sub-component will pass to the common port 162-3 of diplexer 160 and from there to the fifth sub-array 112-5 where the fifth sub-component of the RF signal is radiated by radiating elements 116-12 and 116-13. Since the fifth sub-component is not within the 1427-1518 MHz "pass-band" of port 162-2, the fifth sub-component will not pass to the second circuit element 170 or to any radiating elements in the second column 130-2 of radiating elements. Thus, the first RF signal that is input at RF port 120-1 is passed to a first array 140-1 of radiating elements that includes radiating elements 114-1 through 114-9 and radiating elements 116-12 and 116-13. The first array 140-1 is a linear array of radiating elements, and the diplexer 160 has no impact on RF signals entered at the first RF port 120-1 other than incurring a small insertion loss.

A second RF signal may be input at RF port 120-2. As discussed above, the second RF signal may either be within the 1427-1518 MHz frequency band or within the 1695-2690 MHz frequency band. The second RF signal is divided into five sub-components and phase shifted by the phase shifter assembly 152-2. The first through fourth sub-components of the second RF signal are passed to the respective sub-arrays 112-6 through 112-9 where the sub-components are radiated by radiating elements 116-1 through 116-9. The fifth sub-component is passed to the common port 172-3 of diplexer 170. Operation of the diplexer 170 will vary depending upon the frequency of the second RF signal.

In particular, if the second RF signal that is input at RF port 120-2 is in the 1695-2690 MHz frequency band, the fifth sub-component of this signal will pass to frequency selective port 172-2 of diplexer 170, which has a 1695-2690 MHz pass band. Consequently, the fifth sub-component of the second RF signal will pass through the diplexer 170 to the tenth sub-array 112-10 of radiating elements (radiating elements 116-10 and 116-11). As the sub-component is not within the 1427-1518 MHz pass-band of frequency selective port 172-1, the fifth sub-component will not pass to the first diplexer 160. Thus, signals input at RF port 120-2 that are within the 1695-2690 MHz frequency band will be radiated only by radiating elements 116-1 through 116-11 of the second array 140-2, and hence the second array 140-2 will operate as a second linear array of radiating elements.

If the second RF signal that is input at RF port 120-2 is in the 1427-1518 MHz frequency band, the fifth sub-component of this signal will again pass through the common port 172-3 of diplexer 170. As the fifth sub-component is not within the 1695-2690 MHz pass-band of frequency-selective port 172-2, the subcomponent will not pass to the tenth sub-array 112-10 of radiating elements (radiating elements 116-10 and 116-11). As the fifth sub-component is within the 1427-1518 MHz pass-band of frequency-selective port 172-1, the fifth subcomponent will pass to frequency selective port 162-2 of the first diplexer 160, and will then pass through the first diplexer 160 to the fifth sub-array of radiating elements 112-5. Thus, signals input at RF port 120-2 that are within the 1427-1518 MHz frequency band will be radiated by radiating elements 116-1 through 116-9 and 116-12 and 116-13 of the second array 140-2 (and not by radiating elements 116-10 and 116-11). Thus, when both the first and second circuit elements 160, 170 are implemented as diplexers, the second array 140-2 will operate as either a linear array or as a so-called Y-shaped array depending upon the frequency of the input signal.

Thus, in each case, a second RF signal input at RF port 120-2 will be radiated by eleven of the radiating elements 116. The difference, however, is that if the RF signal is in the higher 1695-2690 MHz frequency range, the radiating elements used to generate the antenna beam are all in a single vertically disposed column 130-2, and hence the second array 140-2 does not act to shrink the azimuth beamwidth of the generated antenna beam. In contrast, if the RF signal is in the lower 1427-1518 MHz frequency range, two of the radiating elements 116 (radiating elements 116-12 and 116-13) that are used to generate the antenna beam are horizontally offset from the remaining nine radiating elements (116-1 through 116-9), and this horizontal offset acts to shrink the azimuth beamwidth of the generated antenna beam. The amount that the azimuth beamwidth shrinks may be a function of (1) the horizontal distance between the two columns 130-1, 130-2 and (2) the ratio of the power of the sub-components of the second RF signal that is delivered to radiating elements 116-1 through 116-9 as compared to the power of the fifth sub-component of the second RF signal that is delivered to radiating elements 116-12 and 116-13.

As the above discussion makes clear, the base station antenna 100 may be configured to reduce the azimuth beamwidth of RF signals input at RF port 120-2 that are in the lower 1427-1518 MHz frequency band, without performing any such reduction in the azimuth beamwidth of RF signals input at RF port 120-2 that are in the higher 1695-2690 MHz frequency band. This approach is used to offset the inherent widening of the azimuth beamwidth that occurs with decreasing frequency in order to provide an array of radiating elements 140-2 that exhibits less variation in azimuth beamwidth across the ultra-wide 1427-2690 MHz frequency band.

In other embodiments, the second circuit element 170 may alternatively be implemented as a power divider having a low-pass filter (or a band-pass filter) on one of the "output" ports thereof (namely port 172-1). The low-pass (or band-pass) filter is configured to pass RF signals in at least the 1427-1518 MHz frequency band while blocking RF signals in the 1695-2690 MHz frequency band. In this embodiment, the second circuit element has two common ports (ports 172-2 and 172-3) that pass signals in the full 1427-2690 MHz frequency range and one frequency selective port (port 172-1). The frequency selective port 172-1 may be designed to only pass signals in the 1427-1518 MHz frequency band, or may be designed to have a "soft" roll-off so that it allows less power to pass with increasing frequency above about 1518 MHz.

When the second circuit element 170 is implemented as a power divider with a filter on one port, the base station antenna 100 may operate as follows. A first RF signal that is within the 1695-2690 MHz frequency band may be input at RF port 120-1. This first RF signal is passed to a first array 140-1 of radiating elements that includes radiating elements 114-1 through 114-9 in the exact same manner as described above with respect to the embodiment where the second circuit element 170 is implemented as a diplexer. Accordingly, further description thereof will be omitted.

A second RF signal may be input at RF port 120-2 that is within either the 1427-1518 MHz frequency band or the 1695-2690 MHz frequency band. The second RF signal is divided into five sub-components and phase shifted by the phase shifter assembly 152-2. The first through fourth sub-components of the RF signal are passed to the respective sub-arrays 112-6 through 112-9 where the sub-components are radiated by radiating elements 116-1 through 116-9. The fifth sub-component is passed to the common port 172-3 of the power divider/low pass filter 170. Once again, operation of the second circuit element 170 will vary depending upon the frequency of the second RF signal.

In particular, if the signal that is input at RF port 120-2 is in the 1695-2690 MHz frequency band, the fifth sub-component of this signal will pass from the common port 172-3 of power divider/filter 170 to common port 172-2 and be provided to the tenth sub-array 112-10 of radiating elements (radiating elements 116-10 and 116-11). The low-band (or pass-band) filter on frequency selective port 172-1 blocks the RF signal (since it is in the higher 1695-2690 MHz frequency band), and hence the second array 140-2 will operate as a linear array that includes radiating elements 116-1 through 116-11 in response to an RF signal in the 1695-2690 MHz frequency band.

If the RF signal that is input at RF port 120-2 is in the 1427-1518 MHz frequency band, the fifth sub-component of this signal will again pass through the common port 172-3 of power divider/filter 170. As the sub-component is within the 1427-1518 MHz pass-band of frequency-selective port 172-1, the subcomponent will pass to the second port 162-2 of diplexer 160, and will then pass through the diplexer 160 to the fifth sub-array 112-5 (i.e., to radiating elements 116-12 and 116-13). Moreover, as the second port 172-2 of power divider/filter 170 is a common port, the signal will also pass to the tenth sub-array 112-10 of radiating elements (radiating elements 116-10 and 116-11). The power divider included in power divider/filter 170 can be set to equally or unequally split the power of the fifth sub-component of the RF signal depending upon a desired amount of narrowing of the azimuth beamwidth. Thus, when the second circuit element 170 is implemented as a power divider/filter 170, the second array 140-2 will operate as an L-shaped array that includes radiating elements 116-1 through 116-13 in response to RF signals in the 1427-1518 MHz frequency range.

As the above discussion makes clear, the second array 140-2 will operate differently based on which implementation is selected for the second circuit element 170. In effect, the diplexer implementation of the second circuit element 170 results in a Y-shaped second array 140-2 for RF signals in the 1427-1518 MHz frequency band, while the power divider/filter implementation of the second circuit element 170 results in an L-shaped second array 140-2 for RF signals in the 1427-1518 MHz frequency band. With both implementations, the second array 140-2 operates as a linear array in response to signals in the 1695-2690 MHz frequency band.

Figure 4A:
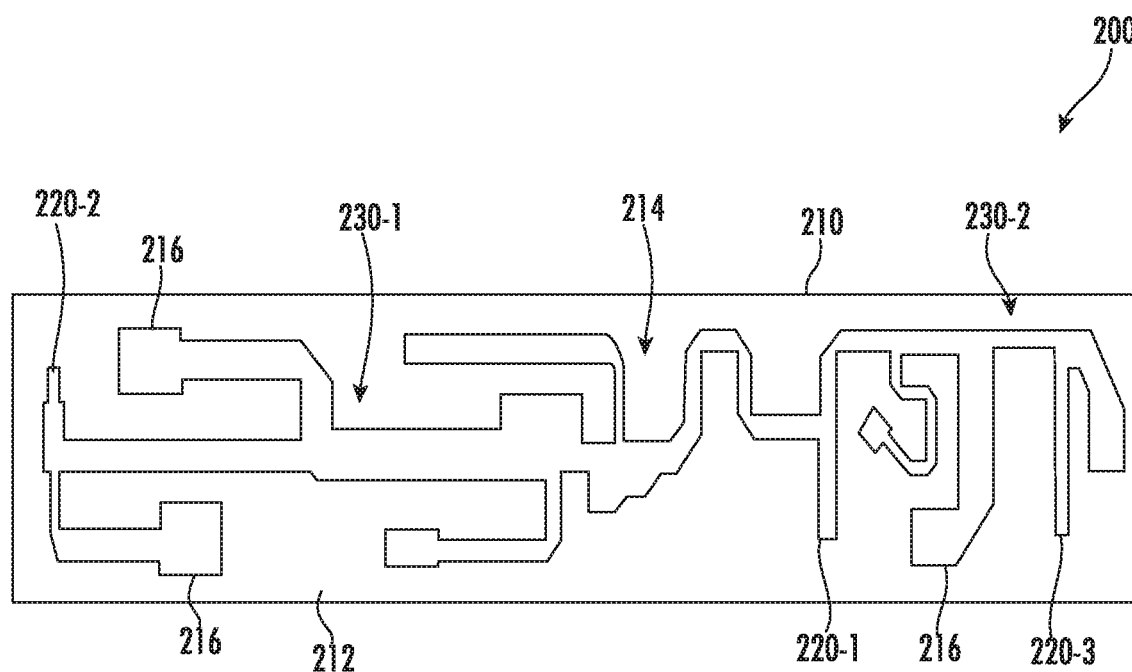
FIG. 4A is a front view of a printed circuit board based diplexer that may be used to implement either or both the first circuit element and/or the second circuit element of the base station antenna of FIG. 3A.

FIG. 4A is a front view of a printed circuit board based diplexer 200 that may be used to implement either or both the first circuit element 160 and/or the second circuit element 170 of the base station antenna 100 of FIGS. 3A-3B in example embodiments of the present invention.

As shown in FIG. 4A, the diplexer 200 is implemented on a microstrip printed circuit board 210. The microstrip printed circuit board 210 may include a dielectric substrate 212 that has a ground plane metallization layer (not shown) covering a back side of the substrate and a metal "trace" pattern 214 on the front side of the substrate 212. The traces of the trace pattern 214 form microstrip transmission line segments and resonating stubs. The metal trace pattern 214 includes three "ports" which represent locations where RF signals may be input and/or output from the diplexer 200. These ports include a first common port 220-1 and a pair of frequency selective ports 220-2, 220-3. A first trace defines a first microstrip transmission line segment 230-1 that connects port 220-1 to port 220-2, and a second trace defines a second microstrip transmission line segment 230-2 that connects port 220-1 to port 220-3. The resonating stubs 216 are designed to form a filter along each microstrip transmission line segment 230-1, 230-2 that passes RF signals in certain frequency bands while rejecting RF signals in other frequency bands.

Figure 4B:
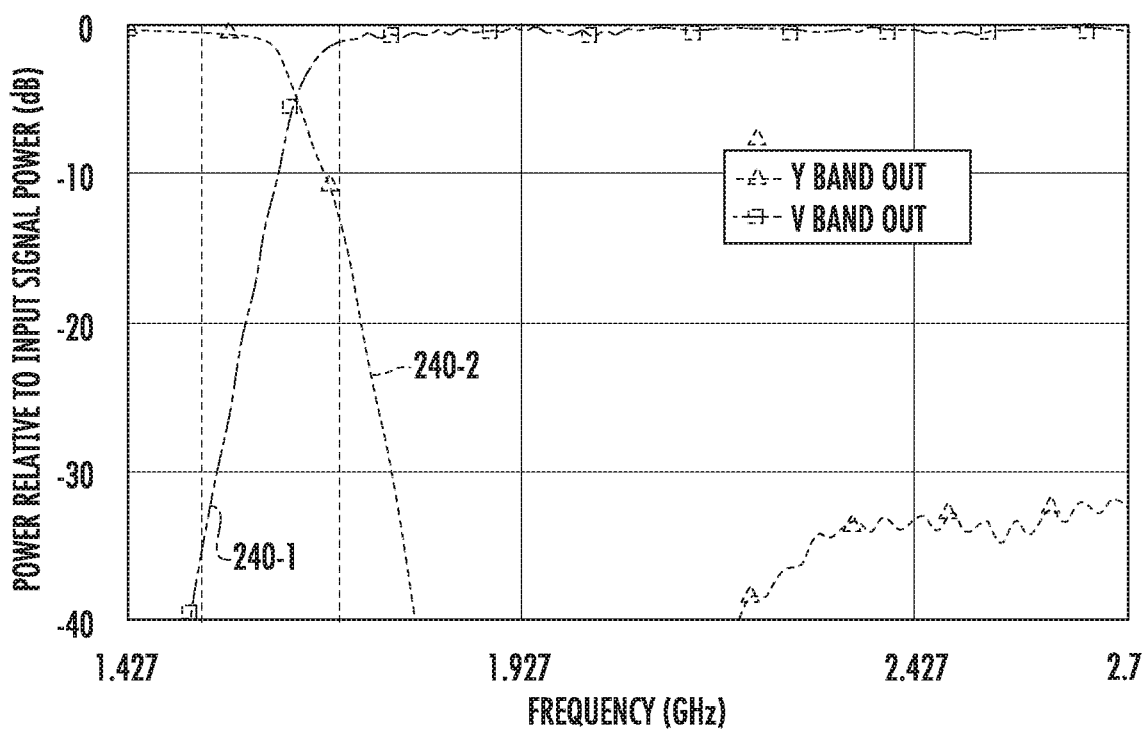
FIG. 4B is a graph showing the simulated response of the diplexer of FIG. 4A.

FIG. 4B is a graph showing the simulated response of the diplexer 200 of FIG. 4A. Curve 240-1 in FIG. 4B shows the magnitude of the signal output at port 220-2 in response to an RF signal input at port 220-1, as a function of frequency, while curve 240-2 shows the magnitude of the signal output at port 220-3 in response to an RF signal input at port 220-1, as a function of frequency. As shown by curve 240-2 in FIG. 4B, signals in the 1427-1518 MHz frequency band that are input to the diplexer 200 at port 220-1 pass with almost no attenuation to port 220-3, while signals in the 1695-2690 MHz frequency range are substantially or completely blocked at port 220-3. In contrast, as shown by curve 240-1 in FIG. 4B, signals in the 1695-2690 MHz frequency band that are input to the diplexer 200 at port 220-1 pass with almost no attenuation to port 220-2, while signals in the 1427-1518 MHz frequency range are substantially or completely blocked at port 220-2.

Figure 5A:
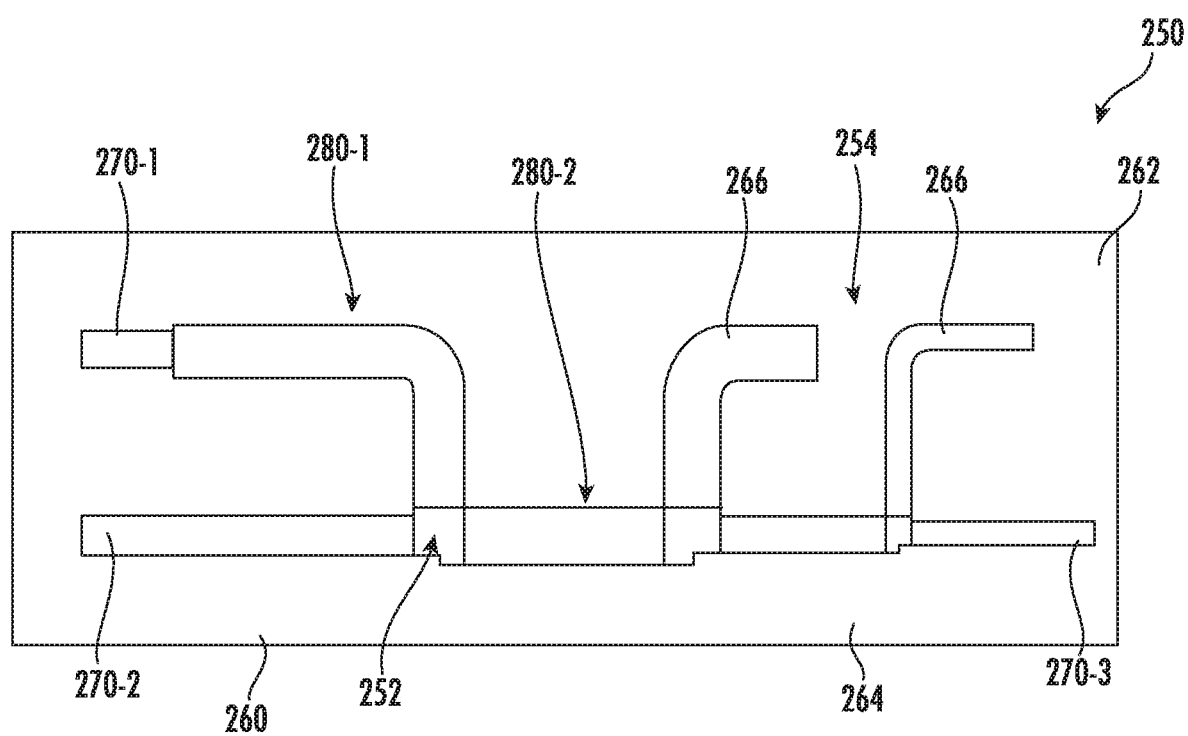
FIG. 5A is a front view of a printed circuit board based power divider having a low pass filter at one output thereof that may be used to implement the second circuit element of the base station antenna of FIG. 3A.
Figure 5B:
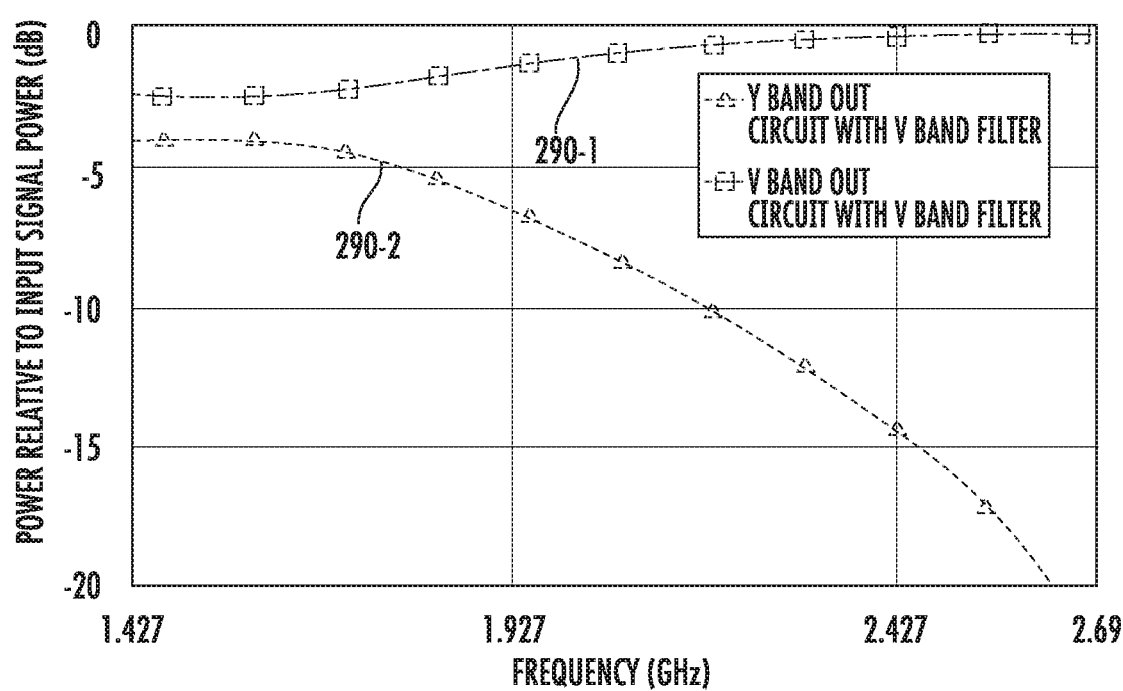
FIG. 5B is a graph showing the simulated response of the power divider/low pass filter circuit of FIG. 5A.

FIG. 5A is a front view of a printed circuit board based power divider 250 having a low pass filter at one output thereof that may be used to implement the second circuit element 170 of the base station antenna 100 of FIGS. 3A-3B in an example embodiment of the present invention. FIG. 5B is a graph showing the simulated response of the power divider/low pass filter circuit 250 of FIG. 5A.

As shown in FIG. 5A, the power divider/low pass filter circuit 250 is implemented on a microstrip printed circuit board 260. The power divider/low pass filter circuit 250 includes a power divider 252 and a low pass filter 254. The microstrip printed circuit board 260 may include a dielectric substrate 262 that has a ground plane metallization layer (not shown) covering a back side of the substrate and a metal "trace" pattern 264 on the front side of the substrate 262. The traces of the trace pattern 264 form microstrip transmission line segments and resonating stubs 266. The metal trace pattern 264 includes three "ports" which represent locations where RF signals may be input and/or output from the power divider/low pass filter circuit 250. These ports include first and second common ports 270-1, 270-2 which form the input port and a first output port of the power divider 252, respectively, and a second output port 270-3 of the power divider 252 which includes the low pass filter 254 that makes output port 270-3 a frequency selective port. A first trace defines a first microstrip transmission line segment 280-1 that connects port 270-1 to port 270-2, and a second trace defines a second microstrip transmission line segment 280-2 that connects port 270-1 to port 270-3. The resonating stubs 266 form the low pass filter 254.

FIG. 5B is a graph showing the simulated response of the power divider/low pass filter circuit 250 of FIG. 5A. Curve 290-1 in FIG. 5B shows the magnitude of the signal output at port 270-2 in response to an RF signal input at port 270-1, as a function of frequency, while curve 290-2 shows the magnitude of the signal output at port 270-3 in response to an RF signal input at port 270-1, as a function of frequency. As shown in FIG. 5B, signals in the 1427-1518 MHz frequency band that are input to the splitter/low pass filter circuit 250 are split and output at both ports 270-2 and 270-3, with the magnitude of the signal output at port 270-2 being about 1 or 1.5 dB higher than the magnitude of the signal output at port 270-3. In contrast, signals in the 1695-2690 MHz frequency band that are input to the splitter/low pass filter circuit 250 at port 270-1 pass to port 270-2 with about 3 dB attenuation at the low portion of the frequency range and with almost no attenuation at the high end of the frequency range, while the signals output at port 270-3 have increasing attenuation with increasing frequency.

The shape of curve 290-2 in FIG. 5B may be changed by increasing or decreasing the number of resonating stubs 266 included in the low pass filter 254. If additional resonating stubs 266 are added, then the power at port 270-3 decreases more quickly with increasing frequency, whereas if less resonating stubs 266 are included, then the power at port 270-3 decreases more slowly with increasing frequency. Thus, the design of the filter 254 may be used to further tune the azimuth HPBW as a function of frequency.

Figure 6A:
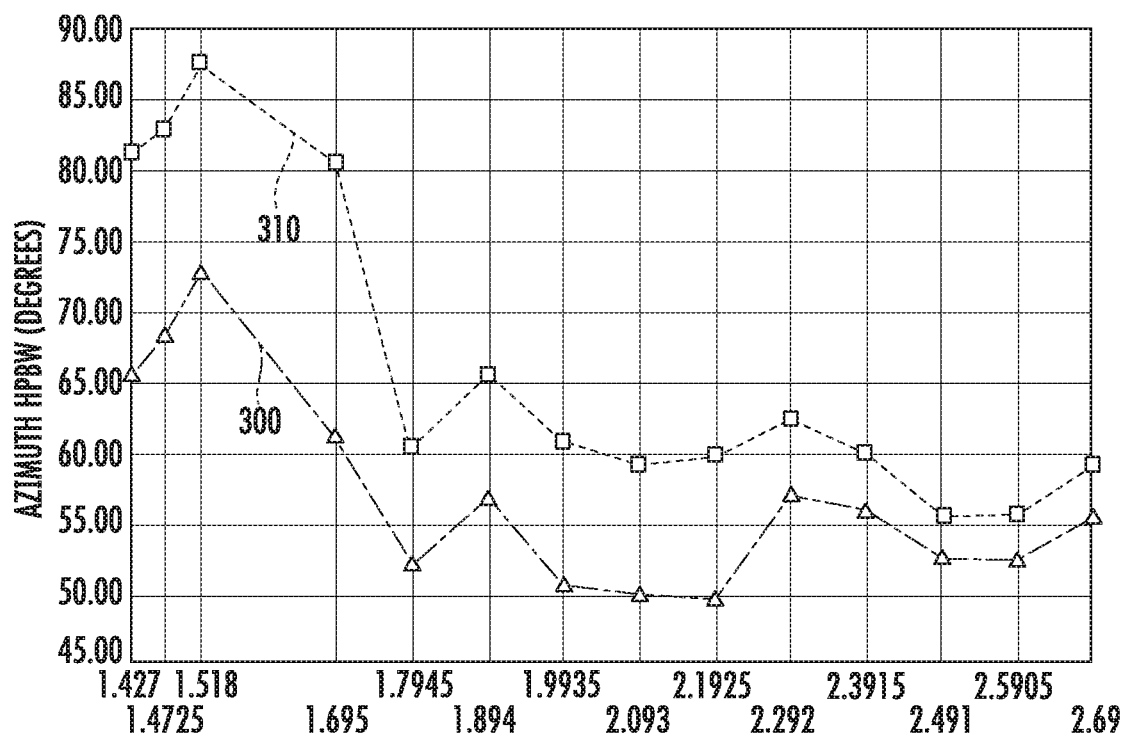
FIG. 6A is a graph of the simulated azimuth HPBW as a function of frequency for the second array of radiating elements of the base station antenna of FIGS. 3A-3B implemented using the diplexer of FIG. 4A as the first circuit element and the splitter/low pass filter circuit of FIG. 5A as the second circuit element as compared to the azimuth HPBW for a comparable single column linear array of radiating elements.

FIG. 6A is a graph of the simulated azimuth HPBW as a function of frequency for the second array of radiating elements 140-2 of the base station antenna 100 of FIGS. 3A-3B when the diplexer 200 of FIG. 4A is used as the first circuit element 160 and the power divider/low pass filter circuit 250 of FIG. 5A is used as the second circuit element 170 (curve 300). For purposes of comparison, FIG. 6A also includes a graph of the simulated azimuth HPBW for a comparable single column linear array of radiating elements (curve 310).

As shown in FIG. 6A, the azimuth HPBW (curve 310) for the conventional linear array of radiating elements varies between a low value of about 55.5° and a high value of about 88°, for total variation of more than 32°. This amount of variation is typically unacceptable as the large azimuth HPBW in the lower portion of the frequency band results in low gain values within the sector served by the linear array and high interference levels in neighboring sectors. As shown by curve 300, the second array 140-2 of the base station antenna 100 according to embodiments of the present invention has an azimuth HPBW that varies between a low value of about 56° and a high value of about 75°, for total variation of only 19°, which is more than 13° less than the variation seen for the conventional linear array.

Figure 6B:
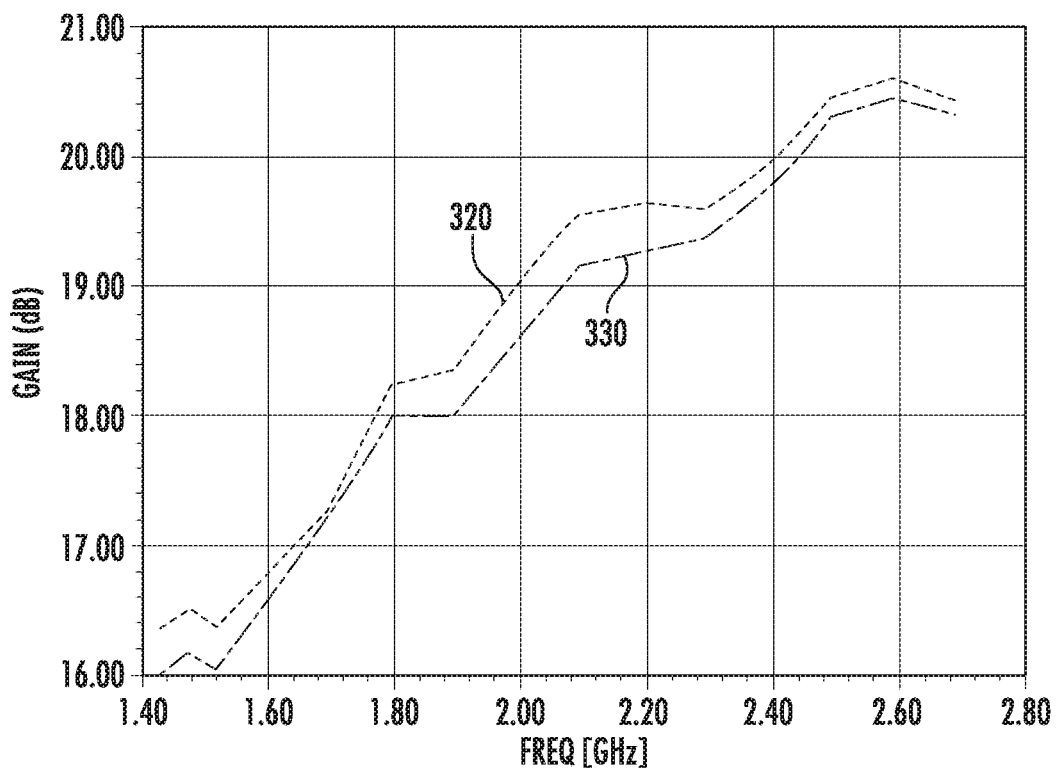
FIG. 6B is a graph of the simulated gain as a function of frequency for the second array of radiating elements of the base station antenna of FIGS. 3A-3B implemented using the diplexer of FIG. 4A as the first circuit element and the splitter/low pass filter circuit of FIG. 5A as the second circuit element as compared to the simulated gain for a comparable single column linear array of radiating elements.

FIG. 6B is a graph of the simulated gain as a function of frequency for the second array 140-2 of radiating elements of the base station antenna 100 of FIGS. 3A-3B implemented using the diplexer 200 of FIG. 4A as the first circuit element 160 and the power divider/low pass filter circuit 250 of FIG. 5A as the second circuit element 170 (curve 320). For purposes of comparison, FIG. 6B also includes a graph of the simulated gain for a comparable single column linear array of radiating elements (curve 330). As shown in FIG. 6B, the gain of the second array 140-2 of base station antenna 100 is higher than the gain of the conventional linear array across the entire frequency range. The first and second circuit elements 160, 170 each introduce insertion losses which reduce the gain of the second linear array 140-2 as compared to the conventional array. However, the narrowing of the azimuth beamwidth, particularly in the lower end of the frequency range, results in increased gain that more than offsets the insertion loss. Thus, the base station antennas 100 according to embodiments of the present invention may also exhibit improved gain performance.

Figure 7:
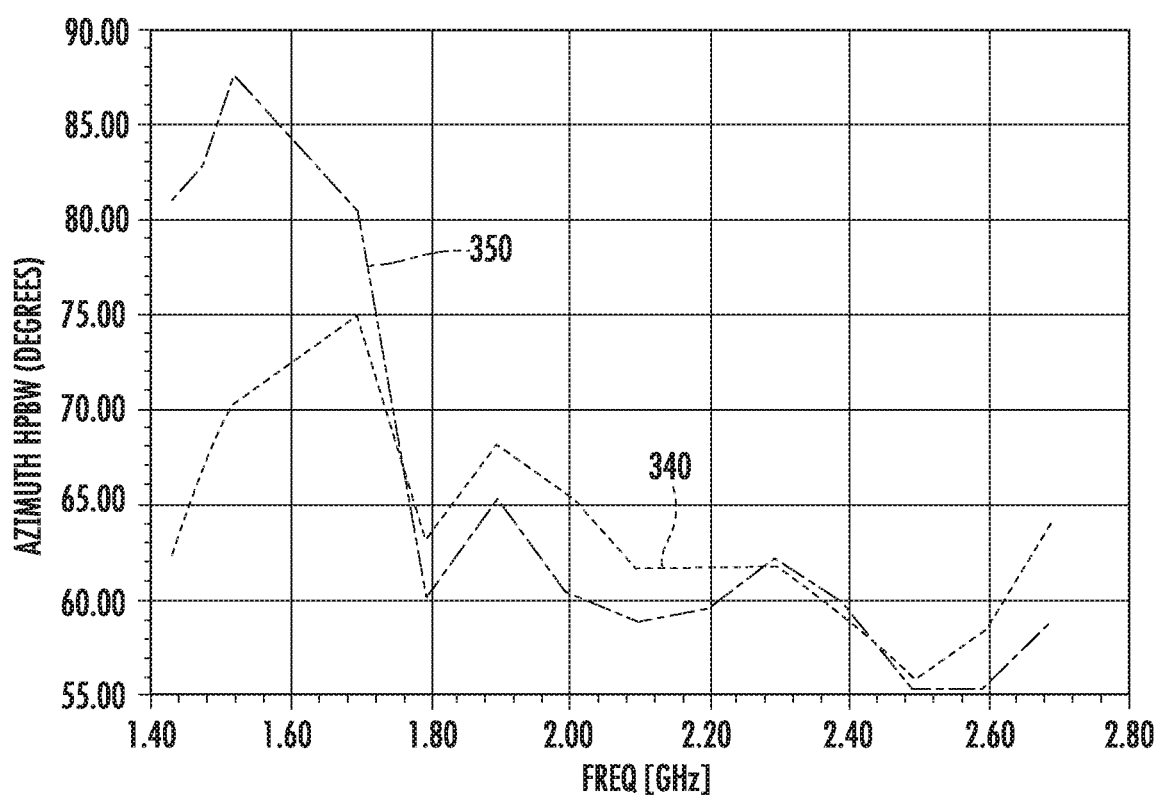
FIG. 7 is a graph of the simulated azimuth HPBW as a function of frequency for the second array of radiating elements of the base station antenna of FIGS. 3A-3B implemented using the diplexer of FIG. 4A as both the first circuit element and the second circuit element as compared to the azimuth HPBW for a comparable single column linear array of radiating elements.

FIG. 7 is a graph of the simulated azimuth HPBW as a function of frequency for the second array of radiating elements 140-2 of the base station antenna 100 of FIGS. 3A-3B implemented using the diplexer 200 of FIG. 4A as both the first circuit element 160 and the second circuit element 170 (curve 340). For purposes of comparison, FIG. 7 also includes a graph of the simulated azimuth HPBW for a comparable single column linear array of radiating elements (curve 350).

As shown in FIG. 7, the second array 140-2 of the base station antenna 100 according to embodiments of the present invention has an azimuth HPBW that varies between a low value of about 56° and a high value of about 75°, for total variation of only 19°, which is more than 13° less than the variation seen for the conventional linear array.

Figure 8A:
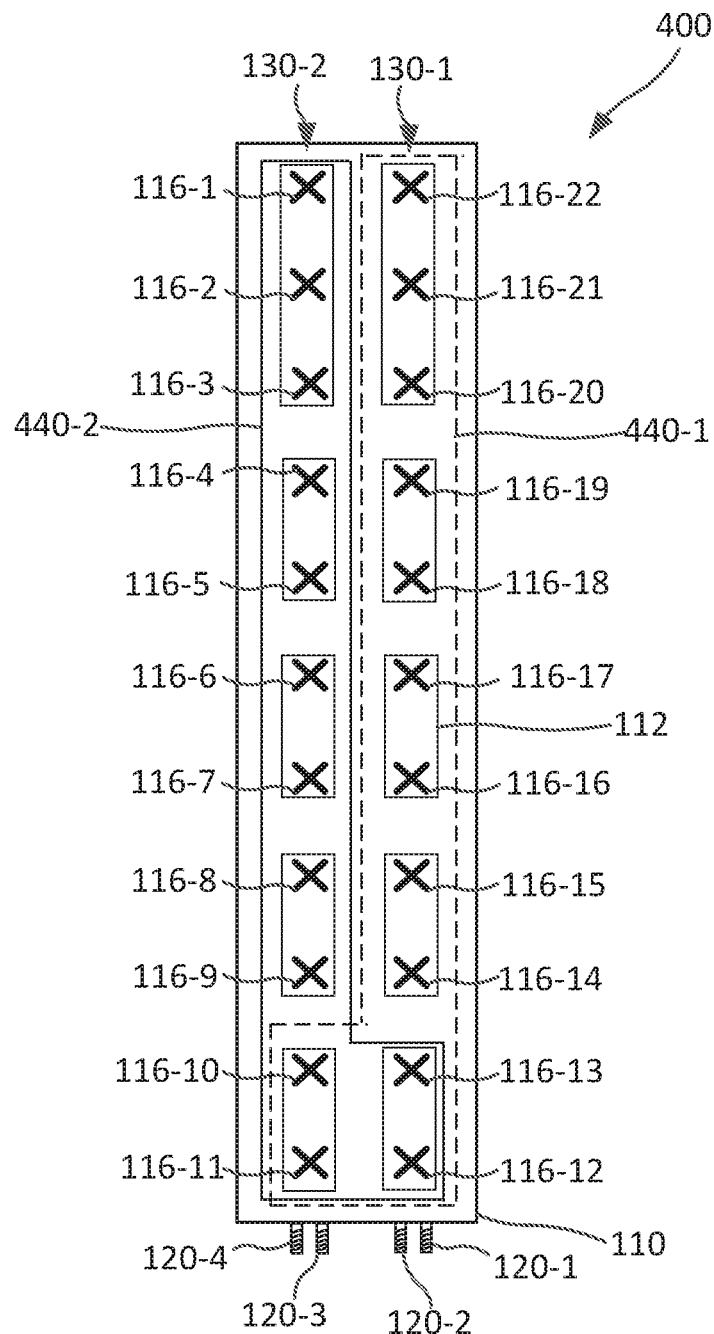
FIG. 8A is a schematic front view of a base station antenna according to further embodiments of the present invention.
Figure 8B:
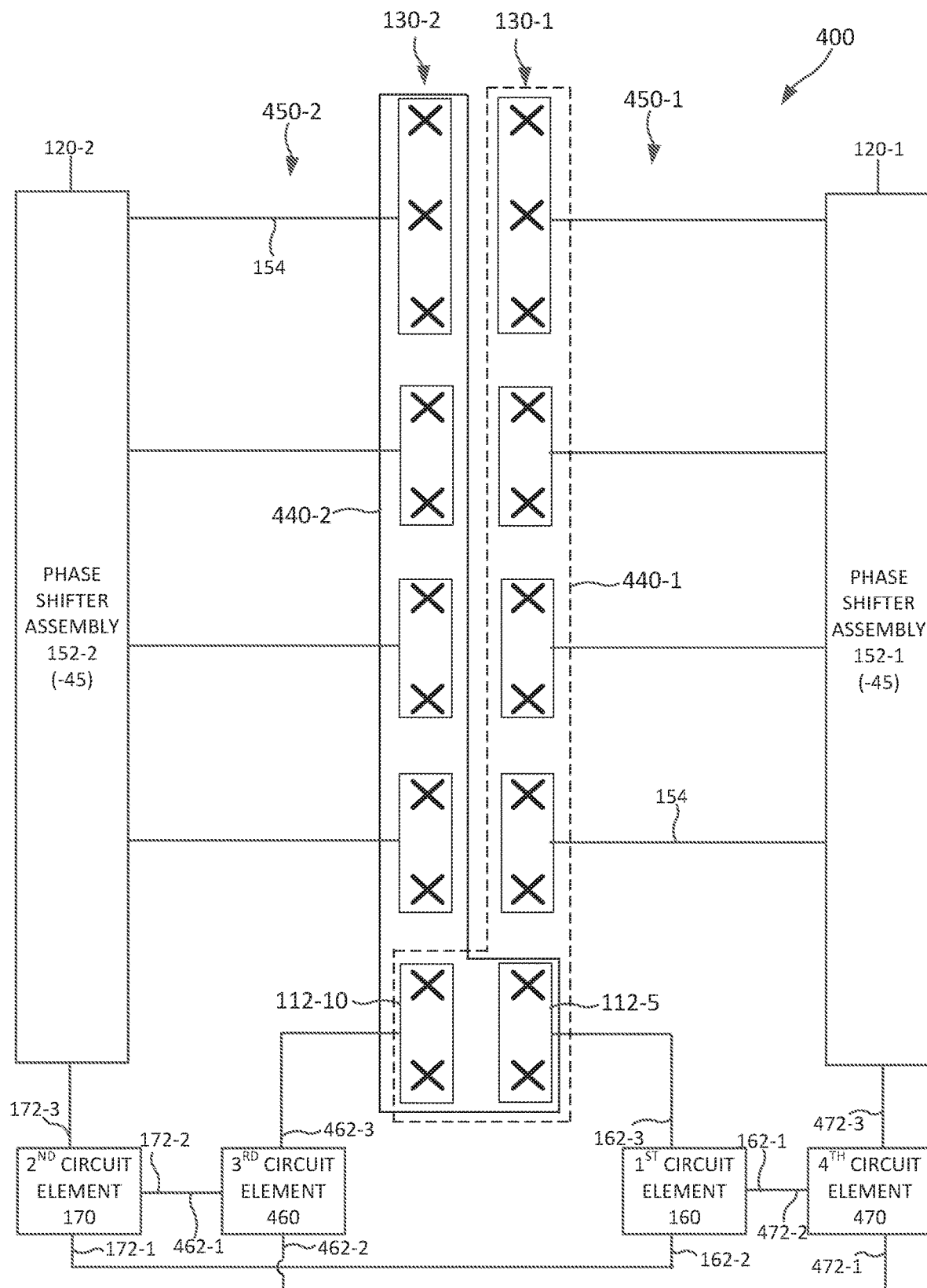
FIG. 8B is a schematic block diagram illustrating the feed networks for the base station antenna of FIG. 8A.

FIG. 8A is a schematic front view of a base station antenna 400 according to further embodiments of the present invention. FIG. 8B is a schematic block diagram illustrating two of the feed networks 450 for the base station antenna 400 of FIG. 8A.

As shown in FIGS. 8A-8B, the base station antenna 400 is similar to the base station antenna 100 of FIGS. 3A-3B. However, the base station antenna 400 differs from the base station antenna 100 in four ways. First, base station antenna 400 includes a third circuit element 460 that may be identical to the first circuit element 160. Second, base station antenna 400 includes a fourth circuit element 470 that may be identical to the second circuit element 170. Third, all of the radiating elements in base station antenna 400 are implemented as radiating elements that operate across the full 1427-2690 MHz frequency band, and hence are labelled as radiating elements 116-1 through 116-22 in FIG. 8A. Fourth, the first array 440-1 of base station antenna 400 also includes radiating elements 116-10 and 116-11, which are in the second column 130-2 of radiating elements.

As can be seen from FIGS. 8A-8B, in base station antenna 400, each array 440-1, 440-2 has the exact same configuration, using a pair of extra circuits to reduce the azimuth beamwidth in the lower portion of the frequency band. The second feed network 450-2 and the second array 440-2 may be identical in design and operation to the second feed network 150-2 and the second array 140-2 of base station antenna 100, except that output 172-2 of the second circuit element 170 is coupled to the tenth sub-array 112-10 through the third circuit element 460. In addition, the first feed network 450-1 and the first array 440-1 may also be identical in design and operation to the second feed network 150-2 and the second array 140-2 of base station antenna 100, except that output 472-2 of the fourth circuit element 470 is coupled to the fifth sub-array 112-5 through the first circuit element 160. As both the first and second arrays 440-1, 440-2 of base station antenna 400 will operate in the same fashion as the second array 140-2 of base station antenna 100, further description of FIGS. 8A-8B will be omitted.

Figure 9A:
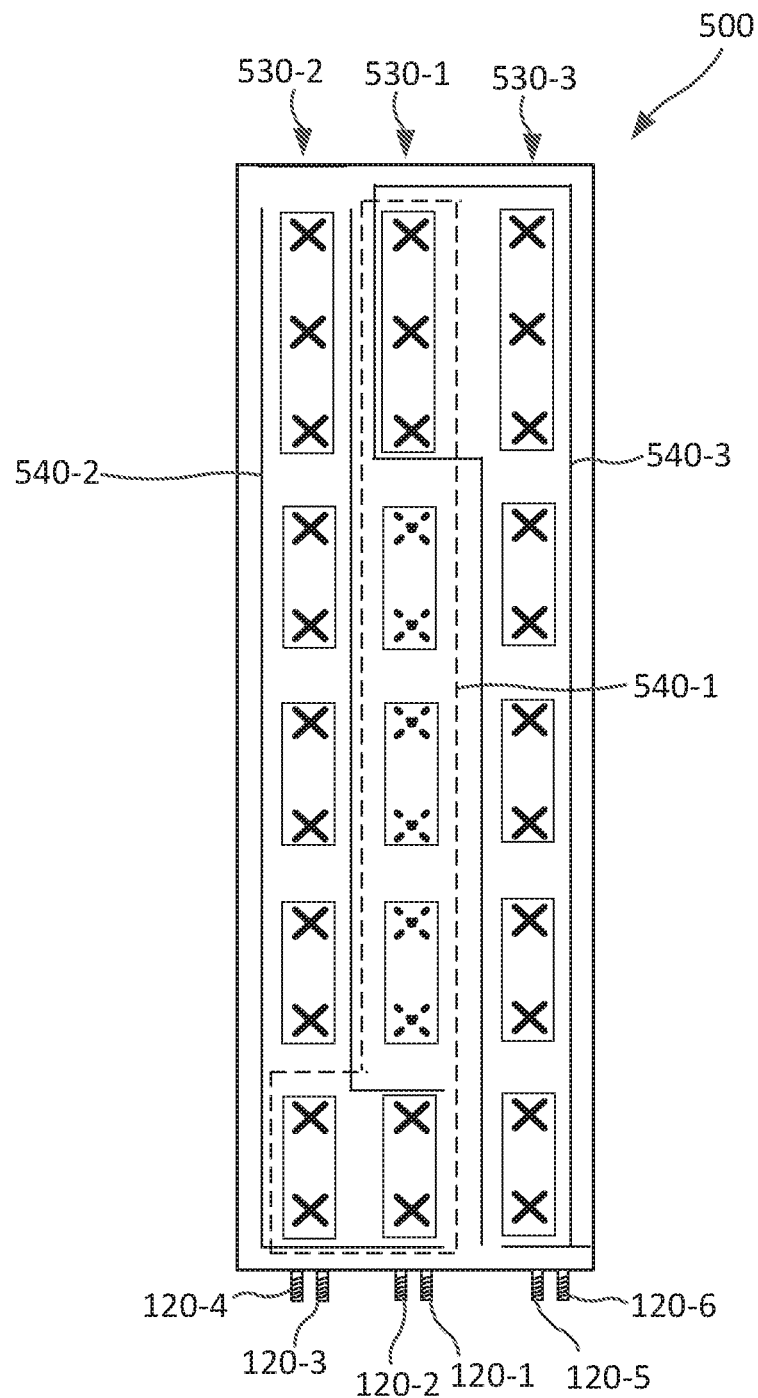
FIG. 9A is a schematic front view of a base station antenna according to still further embodiments of the present invention that includes three columns of radiating elements.
Figure 9B:
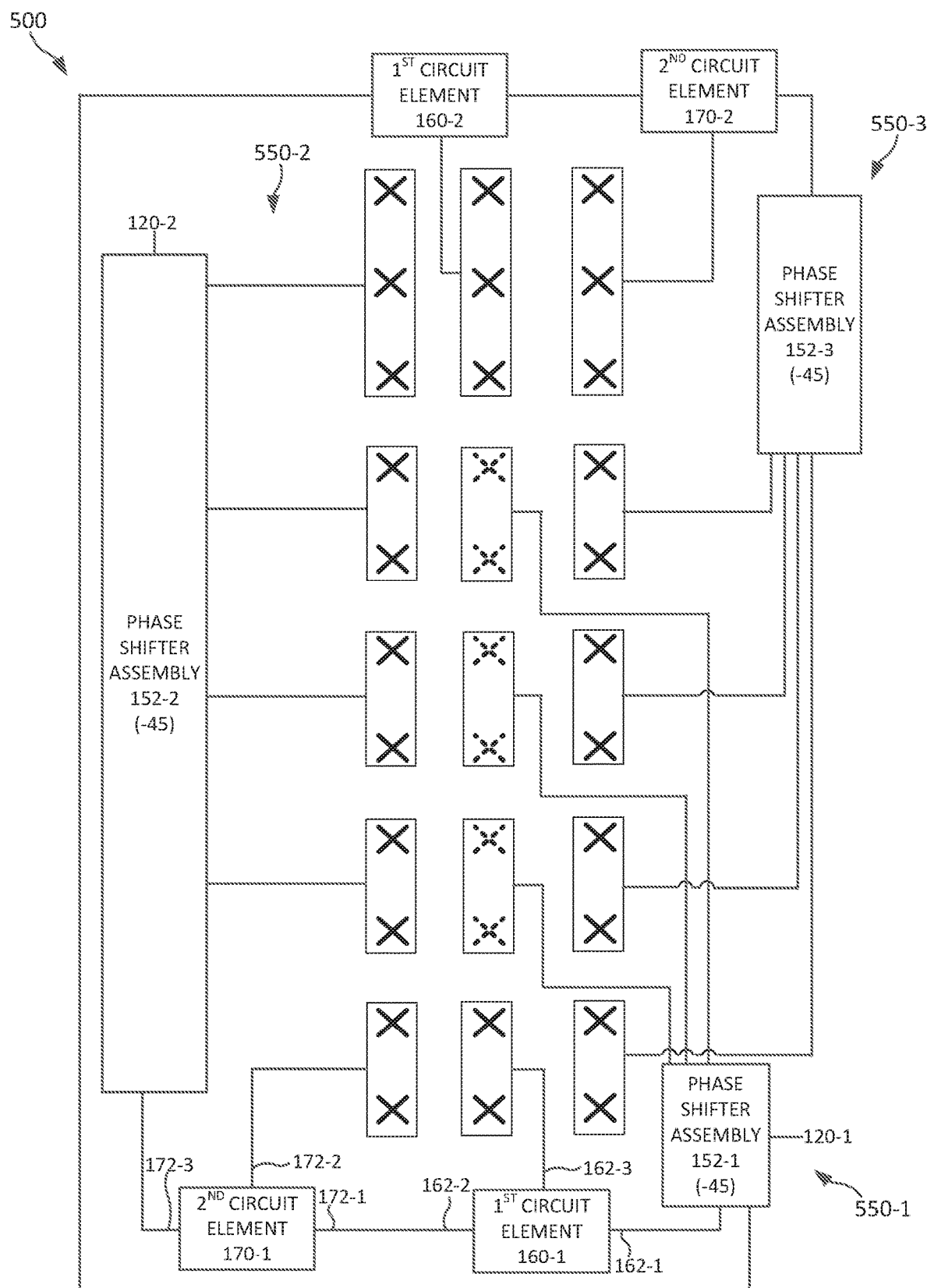
FIG. 9B is a schematic block diagram illustrating the feed networks for the base station antenna of FIG. 9A.

FIG. 9A is a schematic front view of a base station antenna 500 according to still further embodiments of the present invention that includes three columns 530-1 through 530-3 of radiating elements that form three arrays 540-1 through 540-3 of radiating elements. FIG. 9B is a schematic block diagram illustrating the feed networks 550-1 through 550-3 for the base station antenna 500 of FIG. 9A. Base station antenna 500 is very similar to base station antenna 100 discussed above, except that base station antenna 500 further includes the third column 530-3 of radiating elements and shares radiating elements at the top of the first column 530-1 to provide a third array 540-3 that has frequency selective properties.

Feed network 550-1 and array 540-1 may be identical to feed network 150-1 and array 140-1 of base station antenna 100, except that (1) feed network 550-1 further includes an additional first circuit element 160-2 that is coupled between the top sub-array of radiating elements in column 530-1 and the phase shifter assembly 152-1 and (2) the top sub-array of radiating elements in column 530-1 is implemented using the wider band radiating elements 116. Feed network 550-2 and array 540-2 may be identical to feed network 150-2 and array 140-2 of base station antenna 100. The third feed network 550-3 may be identical to feed network 550-2 except that the shared radiating elements are at the top of column 530-1.

Figure 10:
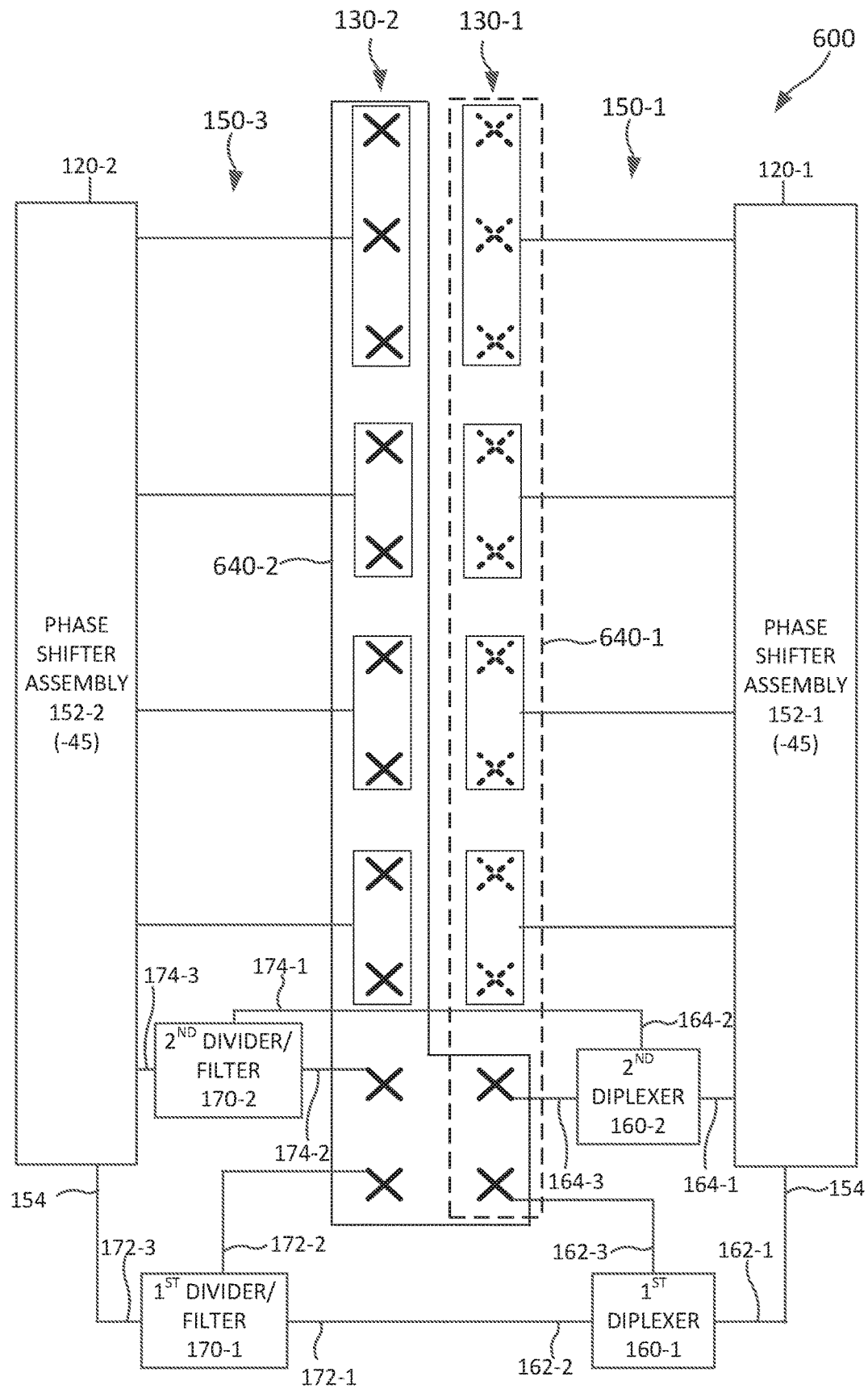
FIG. 10 is a schematic block diagram illustrating a base station antenna according to still further embodiments of the present invention.

FIG. 10 is a schematic block diagram of a base station antenna 600 according to still further embodiments of the present invention that is designed to narrow the azimuth beamwidth differently for an array of radiating elements in three different sub-bands. The base station antenna 600 illustrates how the concept of using additional circuit elements such as circuit elements 160 and 170 to reduce the azimuth HPBW for a first sub-band of an operating frequency band may be extended so that the azimuth HPBW may be reduced for multiple sub-bands, with the azimuth HPBW for each sub-band being reduced a different amount.

As shown in FIG. 10, the base station antenna 600 is similar to the base station antenna 100, but includes an additional first circuit element 160-2 and an additional second circuit element 170-2. In this embodiment, both first circuit elements 160-1, 160-2 are implemented as diplexers and both second circuit elements 170-1, 170-2 are implemented as power dividers with low pass filters, although it will be appreciated that embodiments of the invention are not limited thereto.

As shown in FIG. 10, the base station antenna 600 is identical to base station antenna 100 except that (1) the first diplexer 160-1 is only coupled to the bottom radiating element 116 in the first column 130-1, (2) the first divider/filter 170-1 is only coupled to the bottom radiating element 116 in the second column 130-2, (3) a second diplexer 160-2 is provided that is coupled to the next to bottommost radiating element 116 in the first column 130-1, and (4) a second divider/filter 170-2 is provided that is coupled to the next to bottommost radiating element 116 in the second column 130-2. The second diplexer 160-2 and the second divider/filter 170-2 are configured to allow the next to the bottommost radiating element in the first column 130-1 to be shared between the two arrays 640-1, 640-2, but for different frequency ranges as compared to the bottommost radiating element in the first column 130-1.

In an example embodiment, the first diplexer 160-1 may be implemented to have a 1427-1518 MHz frequency selective port 162-2, a 1695-2690 MHz frequency selective port 162-1 and a common port 162-3. The second diplexer 160-2 may be implemented to have a 1695-2690 MHz frequency selective port 164-1, a 1427-2200 MHz frequency selective port 164-2 and a common port 164-3. The first diplexer/filter 170-1 may be implemented as a power divider having a port with a low pass filter with a nominal cutoff frequency between 1518 MHz and 1695 MHz as well as first and second common ports 172-2, 172-3. The second diplexer/filter 170-2 may be implemented as a power divider having a port 174-1 with a low pass filter with a nominal cutoff frequency between 2200 MHz and 2300 MHz as well as first and second common ports 174-2, 174-3.

The first array 640-1 of radiating elements of base station antenna 600 will, like the first array 140-1 of base station antenna 100, operate as a linear array of radiating elements for RF signals that are anywhere within the 1427-2690 MHz frequency range. The second array 640-2 of radiating elements of base station antenna 600 will, like the first array 140-2 of base station antenna 100, operate as a linear array of eleven radiating elements 116-1 through 116-11 for RF signals that are within the 2300-2690 MHz frequency range. The second array 640-2 of radiating elements will, like the second array 140-2 of radiating elements of base station antenna 100, operate as a two column array that includes all eleven elements in column 130-2 as well as the bottom two radiating elements of column 130-1 for RF signals that are within the 1427-1518 MHz frequency range. The second array 640-2 of radiating elements differs from the second array 140-2 of radiating elements of base station antenna 100, however, in that it will operate as a two column array that includes all eleven elements in column 130-2 as well as the next to bottommost radiating element of column 130-1 for RF signals that are within the 1695-2200 MHz frequency range, whereas the second array 140-1 of radiating elements of base station antenna 100 operates as a linear array for such signals. The base station antenna 600 may further reduce the variation in the azimuth HPBW across the 1427-2690 MHz frequency band.

The base station antenna 600, therefore, includes first and second RF ports 120-1, 120-2 and first and second horizontally offset vertical columns 130-1, 130-2 of radiating elements. More than half of the radiating elements in the first vertical column 130-1 are part of a first array 640-1 of radiating elements that is coupled to the first RF port 120-1 through a first feed network 150-1, and more than half of the radiating elements in the second vertical column 130-2 are part of a second array 640-2 of radiating elements that is coupled to the second RF port 120-2 through a second feed network 150-2. The second array 640-2 of radiating elements includes a first number of the radiating elements (here zero) in the first column 130-1 for RF signals that are within a first frequency range (here the 2300-2690 MHz frequency range) and a second number of the radiating elements (here one) in the first column 130-1 for RF signals that are within a second frequency range (here the 1695-2200 MHz frequency range) that is lower than the first frequency range, the second number being larger than the first number. The second array 640-2 of radiating elements includes a third number (here two) of the radiating elements in the first column 130-1 for RF signals that are within a third frequency range (here the 1427-1518 MHz frequency range) that is lower than the second frequency range, the third number being larger than the second number.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

It will be understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A base station antenna, comprising:
a first radio frequency ("RF") port;
a second RF port;
a first array of radiating elements that is coupled to the first RF port through a first feed network;
a second array of radiating elements that is coupled to the second RF port through a second feed network;
a first frequency selective circuit element; and
a second frequency selective circuit element;
wherein the first frequency selective circuit element has a first port coupled to the first feed network, a second port coupled to a first port of the second frequency selective circuit element, and a third port coupled to a first radiating element of the first array of radiating elements, the second and third ports of the first frequency selective circuit configured to pass RF signals in different frequency bands, and
wherein the second frequency selective circuit element has a second port coupled to a first radiating element of the second array of radiating elements and a third port coupled to the second feed network, the first and second ports of the second frequency selective circuit configured to pass RF signals in different frequency bands,
wherein the second array includes a first number of radiating elements when operating in a first frequency band and a larger number of radiating elements when operating in a second frequency band.

2. The base station antenna of claim 1, wherein the first radiating element of the first array of radiating elements is also part of the second array of radiating elements.

3. The base station antenna of claim 2, wherein the first frequency selective circuit element is a diplexer.

4. The base station antenna of claim 3, wherein the second frequency selective circuit element is a power divider with a filter on a first output port thereof.

5. The base station antenna of claim 1, wherein the second array of radiating elements is configured to operate in a first frequency range that includes the first frequency band and the second frequency band and the first array of radiating elements is configured to operate in a second frequency range that partially, but not completely, overlaps with the first frequency range.

6. The base station antenna of claim 5, wherein the second frequency selective circuit element is configured to pass signals input at the third RF port that are in a portion of the second frequency range that overlaps with the first frequency range to the first radiating element of the second array of radiating elements and to pass signals input at the third RF port that are in a portion of the second frequency range that does not overlap with the first frequency range to the first frequency selective circuit element.

7. A base station antenna, comprising:
a first radio frequency ("RF") port;
a second RF port;
a first array of radiating elements that is coupled to the first RF port through a first feed network;
a second array of radiating elements that is coupled to the second RF port through a second feed network;
a first circuit element; and
a second circuit element;
wherein the first circuit element has a first port coupled to the first feed network, a second port coupled to a first port of the second circuit element, and a third port coupled to a first radiating element of the first array of radiating elements, and
wherein the second circuit element has a second port coupled to a first radiating element of the second array of radiating elements and a third port coupled to the second feed network,
wherein the first radiating element of the first array of radiating elements is also part of the second array of radiating elements,
wherein the second circuit element is a diplexer.

8. The base station antenna of claim 7, wherein the first circuit element is a diplexer.

9. The base station antenna of claim 7, wherein the first array of radiating elements consists of a first column of radiating elements and wherein the second array of radiating elements consists of a second column of radiating elements and one or more radiating elements of the first array of radiating elements including the first radiating element of the first array of radiating elements.

10. The base station antenna of claim 9, wherein the first column of radiating elements is horizontally offset from the second column of radiating elements.

11. A base station antenna, comprising:
a first radio frequency ("RF") port;
a second RF port;
a first array of radiating elements that is coupled to the first RF port through a first feed network;
a second array of radiating elements that is coupled to the second RF port through a second feed network;
a first circuit element;
a second circuit element;
a third circuit element; and
a fourth circuit element,
wherein the first circuit element has a first port coupled to a second port of the fourth circuit element, a second port coupled to a first port of the second circuit element, and a third port coupled to a first radiating element of the first array of radiating elements, and
wherein the second circuit element has a second port coupled to a first port of the third circuit element and a third port coupled to the second feed network
wherein the third circuit element has a third port coupled to a first radiating element of the second array of radiating elements and a second port coupled to a first port of the fourth circuit element, and
wherein the fourth circuit element has a third port coupled to the first feed network.

12. The base station antenna of claim 11, wherein the third circuit element is a diplexer or a power divider with a low pass filter on a first output thereof, and the fourth circuit element is a diplexer.

13. A base station antenna, comprising:
a first radio frequency ("RF") port;
a second RF port;
a first plurality of radiating elements that are coupled to the first RF port through a first feed network, where the first plurality of radiating elements are arranged in a first column and form a first array of radiating elements; and
a second plurality of radiating elements that are coupled to the second RF port through a second feed network, where the second plurality of radiating elements are arranged in a second column;
a first frequency selective circuit element that has a first port coupled to the first feed network, a second port coupled to the second feed network and a third port coupled to a first of the radiating elements in the first column;

a second frequency selective circuit element that has a first port coupled to the second port of the first frequency selective circuit element, a second port coupled to a first of the radiating elements in the second column and a third port coupled to the second feed network, wherein the first port of the second frequency selective circuit element is configured to block signals within a portion of an operating frequency band of at least some of the radiating elements in the second plurality of radiating elements, and the second port of the first frequency selective circuit element is configured to block signals within a portion of an operating frequency band of at least some of the radiating elements in the first plurality of radiating elements.

14. The base station antenna of claim 13, wherein the second frequency selective circuit element is a diplexer or power divider having a port that includes a low pass filter.

15. The base station antenna of claim 14, wherein the first frequency selective circuit element is a diplexer.

16. The base station antenna of claim 13, wherein the first array of radiating elements is configured to operate in a first frequency range and the second array of radiating elements is configured to operate in a second frequency range that only partially overlaps with the first frequency range.

17. A base station antenna, comprising:
a first radio frequency ("RF") port;
a second RF port;
a first vertical column of radiating elements; and
a second vertical column of radiating elements that is horizontally offset from the first vertical column of radiating elements;
wherein more than half of the radiating elements in the first vertical column of radiating elements are part of a first array of radiating elements that is coupled to the first RF port through a first feed network,
wherein more than half of the radiating elements in the second vertical column of radiating elements are part of a second array of radiating elements that is coupled to the second RF port through a second feed network, and
wherein the second array of radiating elements includes a first number of the radiating elements in the first column for RF signals that are within a first frequency range and a second number of the radiating elements in the first column for RF signals that are within a second frequency range that is lower than the first frequency range, the second number being larger than the first number,
wherein the second array of radiating elements includes a third number of the radiating elements in the first column for RF signals that are within a third frequency range that is lower than the second frequency range, the third number being larger than the second number.

* * * * *